United States Patent
Nagahara et al.

(10) Patent No.: US 10,901,384 B2
(45) Date of Patent: Jan. 26, 2021

(54) MANAGEMENT APPARATUS

(71) Applicant: DAIKIN INDUSTRIES, LTD., Osaka (JP)

(72) Inventors: Kenichi Nagahara, Osaka (JP); Kenta Nohara, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/560,575

(22) Filed: Sep. 4, 2019

(65) Prior Publication Data
US 2020/0018509 A1 Jan. 16, 2020

Related U.S. Application Data

(63) Continuation of application No. PCT/JP2018/014014, filed on Mar. 30, 2018.

(30) Foreign Application Priority Data

Mar. 31, 2017 (JP) ................................. 2017-070837

(51) Int. Cl.
*G05B 19/042* (2006.01)
*F24F 11/63* (2018.01)

(52) U.S. Cl.
CPC ............ *G05B 19/042* (2013.01); *F24F 11/63* (2018.01); *G05B 2219/2614* (2013.01)

(58) Field of Classification Search
CPC ......... F24F 11/54; F24F 11/63; G05B 19/042; G05B 2219/2614; G08C 25/00; H04L 12/28; H04Q 2209/823; H04Q 9/00
(Continued)

(56) References Cited

U.S. PATENT DOCUMENTS 8,266,919 B2 * 9/2012 Okano .................. H04L 12/283
62/175
10,254,001 B2 * 4/2019 Yoshikawa .............. F24F 11/46
(Continued)

FOREIGN PATENT DOCUMENTS

EP   2 432 208 A1   3/2012
EP   3 163 146 A1   6/2014
(Continued)

OTHER PUBLICATIONS

International Search Report of corresponding PCT Application No. PCT/JP2018/014014 dated May 15, 2018.
(Continued)

*Primary Examiner* — Chun Cao
(74) *Attorney, Agent, or Firm* — Global IP Counselors, LLP

(57) ABSTRACT

An equipment management system includes a control terminal and a management apparatus. The control terminal transmits equipment information related to equipment. The management apparatus includes a CPU and an interface. The management apparatus controls the control terminal through a network. The CPU executes calculation of information processing that is based on information received from the control terminal, determines a load level corresponding to a load of the information processing by the calculation unit, and executes reduction control to reduce the load on the calculation unit in accordance with the load level. The interface being transmits the load level to the control terminal. The control terminal changes, in accordance with the load level, a communication condition of equipment information to be transmitted to the management apparatus.

20 Claims, 18 Drawing Sheets

(58) Field of Classification Search
USPC .......................................................... 700/276
See application file for complete search history.

(56) References Cited

U.S. PATENT DOCUMENTS

2008/0141048 A1* 6/2008 Palmer ................ H04L 67/1008
713/300
2020/0025403 A1* 1/2020 Oumi ....................... F24F 11/58

FOREIGN PATENT DOCUMENTS

| JP | 2010-7947 A | * | 1/2010 |
| JP | 2011-149572 A | | 8/2011 |
| JP | 2011-1495772 A | | 8/2011 |
| JP | 2013-200645 A | | 10/2013 |
| JP | 2015-14410 A | * | 1/2015 |
| JP | 2015-188421 A | | 11/2015 |
| WO | 2013/163890 A1 | | 11/2013 |
| WO | 2014/017053 A1 | | 1/2014 |
| WO | 2015/196488 A1 | | 12/2015 |

OTHER PUBLICATIONS

European Search Report of corresponding EP Application No. 18 778 295.8 dated Feb. 6, 2020.
International Preliminary Report of corresponding PCT Application No. PCT/JP2018/014014 dated Oct. 10, 2019.

* cited by examiner

FIRST COMMUNICATION CONDITION A1

| CONTROL TERMINAL 20a | FIRST STATE INFORMATION D1 | SECOND STATE INFORMATION D2 | THIRD STATE INFORMATION D3 |
|---|---|---|---|
| AIR CONDITIONER 10a | ○ TRANSMITTABLE | ○ TRANSMITTABLE | ○ TRANSMITTABLE |
| AIR CONDITIONER 10b | ○ TRANSMITTABLE | ○ TRANSMITTABLE | ○ TRANSMITTABLE |
| AIR CONDITIONER 10c | ○ TRANSMITTABLE | ○ TRANSMITTABLE | ○ TRANSMITTABLE |

FIG. 4A

SECOND COMMUNICATION CONDITION A2

| CONTROL TERMINAL 20a | FIRST STATE INFORMATION D1 | SECOND STATE INFORMATION D2 | THIRD STATE INFORMATION D3 |
|---|---|---|---|
| AIR CONDITIONER 10a | ○ TRANSMITTABLE | × NOT TRANSMITTABLE | × NOT TRANSMITTABLE |
| AIR CONDITIONER 10b | ○ TRANSMITTABLE | × NOT TRANSMITTABLE | × NOT TRANSMITTABLE |
| AIR CONDITIONER 10c | ○ TRANSMITTABLE | × NOT TRANSMITTABLE | × NOT TRANSMITTABLE |

FIG. 4B

| LOAD LEVEL | DEGREE OF PRIORITY OF EACH PIECE OF EQUIPMENT | | |
|---|---|---|---|
| | HIGH | MIDDLE | LOW |
| Lv1 | PERMIT COMMUNICATION | PERMIT COMMUNICATION | STOP PART OF COMMUNICATION |
| : | PERMIT COMMUNICATION | : | : |
| Lv5 | : | STOP PART OF COMMUNICATION | STOP COMMUNICATION |
| : | STOP PART OF COMMUNICATION | STOP COMMUNICATION | : |
| Lv10 | STOP PART OF COMMUNICATION | STOP COMMUNICATION | STOP COMMUNICATION |

FIG. 8

| | | | DEGREE OF PRIORITY = HIGH | DEGREE OF PRIORITY = MIDDLE | DEGREE OF PRIORITY = LOW | CLASSIFICATION |
|---|---|---|---|---|---|---|
| EQUIPMENT | WHO | DEGREE OF PRIORITY | PRESIDENT | DIRECTOR | ORDINARY EMPLOYEE | (b1) |
| | WHAT | PRESENT/ABSENT (PERSON, THING) | PRESENT | PRESENT | ABSENT | (b2) |
| | | STATE (EQUIPMENT) | ABNORMAL OPERATION | OPERATION | STOP | (b3) |
| | | STATE (SPACE, PERSON, THING) | OUTSIDE COMFORTABLE AREA | OUTSIDE COMFORTABLE AREA | INSIDE COMFORTABLE AREA | (b4) |
| | | MODEL (EQUIPMENT) | HIGH HORSEPOWER | MIDDLE HORSEPOWER | LOW HORSEPOWER | (a1) |
| | | | NEW MODEL | RATHER NEW MODEL | OLD MODEL | (a2) |
| | WHERE | INSTALLATION SITE | PRESIDENT'S ROOM | MEETING ROOM | CORRIDOR | (a3) |
| | WHEN | BUSINESS HOURS | IN WORK HOURS | OVERTIME HOURS | NIGHTTIME | (b5) |
| PURPOSE | WHO | USER RANK | BUILDING MANAGER | TENANT USER | TENANT USER | (b6) |
| | WHAT | DEGREE OF PRIORITY OF SERVICE | ALIVE MONITORING | CONTROL RELATED TO COST OF DEMAND OR THE LIKE | ENERGY SAVING CONTROL | (b7) |

FIG. 9

| COMMUNICATION CONDITION | | | DEGREE OF PRIORITY = HIGH | DEGREE OF PRIORITY = MIDDLE | DEGREE OF PRIORITY = LOW |
|---|---|---|---|---|---|
| LOAD LEVEL = 5 | | | | | |
| | STATE | WHETHER OR NOT TO REDUCE DATA ITEMS | | | |
| | | ALIVE MONITORING | TRANSMITTABLE TO MANAGEMENT APPARATUS | PARTIALLY TRANSMITTABLE TO MANAGEMENT APPARATUS | STOP COMMUNICATION |
| | | STATE MONITORING (HIGH PRIORITY) | TRANSMITTABLE TO MANAGEMENT APPARATUS | PARTIALLY TRANSMITTABLE TO MANAGEMENT APPARATUS | STOP COMMUNICATION |
| | | STATE MONITORING (LOW PRIORITY) | TRANSMITTABLE TO MANAGEMENT APPARATUS | PARTIALLY TRANSMITTABLE TO MANAGEMENT APPARATUS | STOP COMMUNICATION |
| | | TREND DATA | TRANSMITTABLE TO MANAGEMENT APPARATUS | PARTIALLY TRANSMITTABLE TO MANAGEMENT APPARATUS | STOP COMMUNICATION |
| | INSTRUCTION | HIGH PRIORITY | INSTRUCTION CAN BE PROVIDED FROM MANAGEMENT APPARATUS | PARTIALLY TRANSMITTABLE FROM MANAGEMENT APPARATUS | STOP COMMUNICATION |
| | | LOW PRIORITY | INSTRUCTION CAN BE PROVIDED FROM MANAGEMENT APPARATUS | PARTIALLY TRANSMITTABLE FROM MANAGEMENT APPARATUS | STOP COMMUNICATION |
| | TRANSMISSION INTERVAL | | 1 MINUTE | 5 MINUTES | STOP COMMUNICATION |
| | WHETHER OR NOT TO DECREASE DATA ACCURACY | | NOT DECREASE (THIRD DECIMAL PLACE) | INTEGER | STOP COMMUNICATION |

FIG. 12

| LOAD LEVEL = 5 | | | DEGREE OF PRIORITY = HIGH | DEGREE OF PRIORITY = MIDDLE | DEGREE OF PRIORITY = LOW |
|---|---|---|---|---|---|
| PROCESSING IN MANAGEMENT APPARATUS | (a) USED BY BUILDING MANAGER | ALIVE MONITORING | CONTINUE PROCESSING | PARTIALLY LIMIT PROCESSING | LIMIT PROCESSING |
| | | ENERGY VISUALIZATION FUNCTION | CONTINUE PROCESSING | PARTIALLY LIMIT PROCESSING | LIMIT PROCESSING |
| | | TREND DATA COLLECTION FUNCTION | LIMIT PROCESSING | LIMIT PROCESSING | LIMIT PROCESSING |
| | | AUTOMATIC CONTROL FUNCTION | PARTIALLY LIMIT PROCESSING | PARTIALLY LIMIT PROCESSING | LIMIT PROCESSING |
| | (b) USED BY R&D ANALYZER | ALIVE MONITORING | CONTINUE PROCESSING | LIMIT PROCESSING | LIMIT PROCESSING |
| | | ENERGY VISUALIZATION FUNCTION | LIMIT PROCESSING | PARTIALLY LIMIT PROCESSING | LIMIT PROCESSING |
| | | TREND DATA COLLECTION FUNCTION | CONTINUE PROCESSING | LIMIT PROCESSING | LIMIT PROCESSING |
| | | AUTOMATIC CONTROL FUNCTION | PARTIALLY LIMIT PROCESSING | PARTIALLY LIMIT PROCESSING | LIMIT PROCESSING |
| | (c) USED BY END USER | ALIVE MONITORING | CONTINUE PROCESSING | LIMIT PROCESSING | LIMIT PROCESSING |
| | | ENERGY VISUALIZATION FUNCTION | PARTIALLY LIMIT PROCESSING | LIMIT PROCESSING | LIMIT PROCESSING |
| | | TREND DATA COLLECTION FUNCTION | LIMIT PROCESSING | LIMIT PROCESSING | LIMIT PROCESSING |
| | | AUTOMATIC CONTROL FUNCTION | CONTINUE PROCESSING | PARTIALLY LIMIT PROCESSING | LIMIT PROCESSING |

FIG. 17

| MONITORING APPLICATION | PROCESSING LOAD |
|---|---|
| ALIVE MONITORING FUNCTION | LOW |
| AUTOMATIC CONTROL FUNCTION | MIDDLE |
| TREND DATA COLLECTION FUNCTION | SLIGHTLY HIGH |
| ENERGY VISUALIZATION FUNCTION | HIGH |

FIG. 18

MANAGEMENT APPARATUS

CROSS-REFERENCE TO RELATED APPLICATIONS

This application is a continuation application of International application PCT/JP2018/014014 which claims priority under 35 U.S.C. § 119(a) to Japanese Patent Application No. 2017-070837, filed in Japan on Mar. 31, 2017, the entire contents of which are hereby incorporated herein by reference.

BACKGROUND ART

In recent years, utilization of an Internet of Things (IoT) system for remotely monitoring and operating equipment by connecting a control terminal that controls the equipment to a management apparatus (server) through the Internet or the like has been considered. In the IoT system, access to the management apparatus changes according to usage statuses of users, operation statuses of equipment, and so forth. Thus, the load on the management apparatus significantly varies depending on usage statuses of users and so forth. Accordingly, the IoT system is designed so that the management apparatus can withstand a peak load (for example, Patent Literature 1 (International Publication No. 2014/017053) and so forth). For example, auto-scaling may be used so that the management apparatus can withstand a peak load.

SUMMARY

A management apparatus according to a first aspect of the present disclosure is connected through a network to each of a control terminal that is associated with one or more pieces of equipment to control one or more pieces of equipment and transmits equipment information related to the equipment, and a monitoring terminal that transmits a request related to the equipment and monitors a state of the equipment. Here, the management apparatus includes a receiving unit, a calculation unit, a load detecting unit, a load determining unit, and a reduction control unit. The receiving unit receives the request and the equipment information. The calculation unit executes calculation of information processing that is based on the information received by the receiving unit. The load detecting unit detects a load of information processing by a processing unit. The load determining unit determines whether or not the load detected by the load detecting unit is above a threshold value. The reduction control unit executes reduction control to reduce the load on the calculation unit if the load determining unit determines that the load is above the threshold value.

The management apparatus according to the first aspect reduces the load on the processing unit if the load determining unit determines that the load is above the threshold value, and is thus capable of withstanding a peak load without increasing the specifications.

In the present disclosure, a "threshold value" is not limited to the value at one specific point, but includes a value derived from an arithmetic expression or the like.

BRIEF DESCRIPTION OF THE DRAWINGS

FIG. 4A and FIG. 4B are schematic diagrams for describing the configuration of a communication condition database 31D according to the embodiment.

FIG. 8 is a diagram for describing load levels in an application example.

FIG. 9 is a diagram for describing the degrees of priority in the application example.

FIG. 12 is a diagram for describing change in a communication condition according to the first application example.

FIG. 17 is a diagram for describing limitation of a monitoring application in a fifth application example.

FIG. 18 is a diagram for describing a load of the monitoring application in the fifth application example.

DETAILED DESCRIPTION OF EMBODIMENT(S)

(1) Overall Configuration

Figure 1:
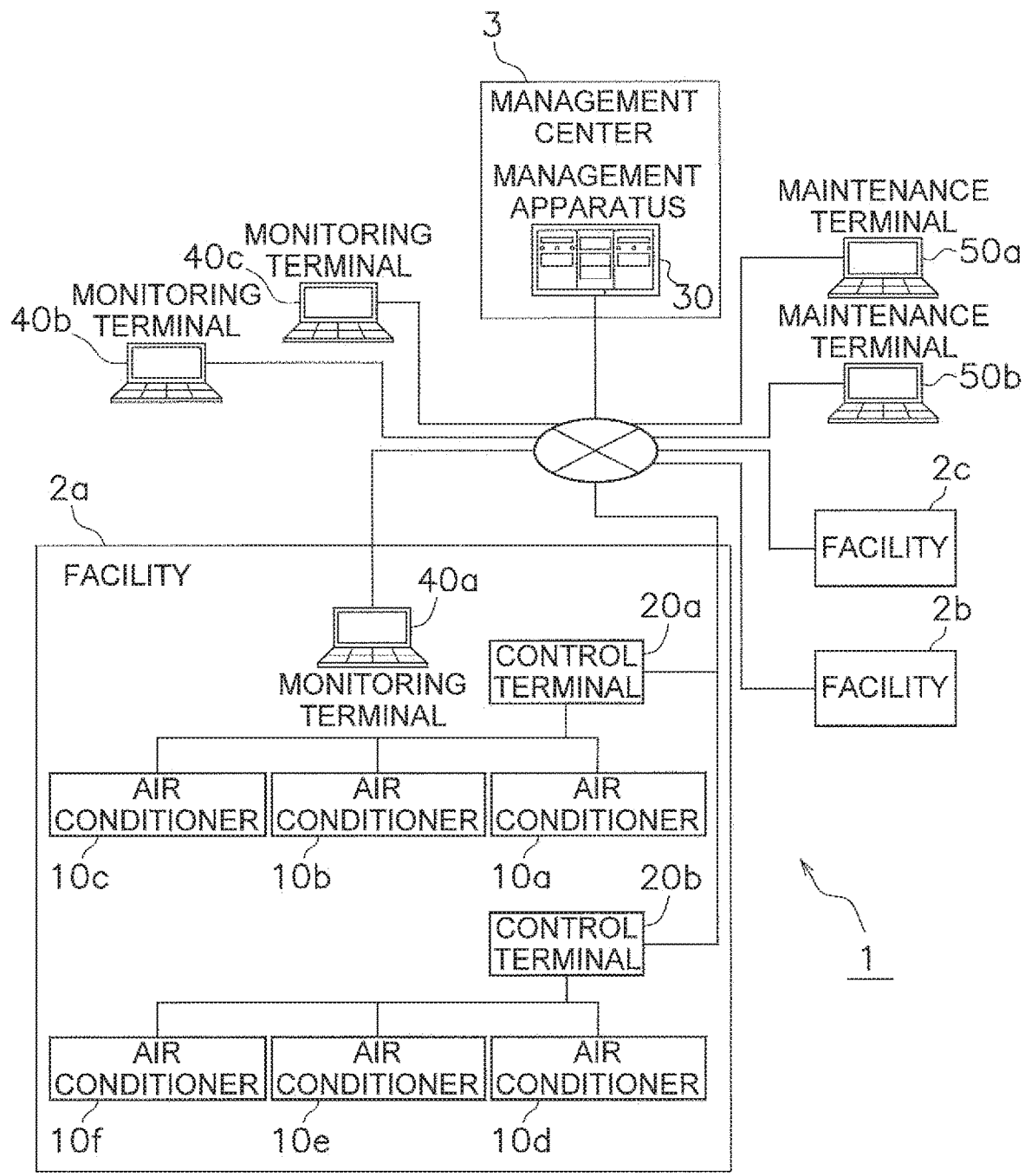
FIG. 1 is a schematic diagram illustrating the configuration of an equipment management system 1 according to one embodiment of the present disclosure.

FIG. 1 is a schematic diagram illustrating the configuration of an equipment management system 1 according to one embodiment of the present disclosure. In the following description, a plurality of apparatuses having similar functions are denoted by the same reference numerals when a common description is given about the apparatuses. When one of a plurality of apparatuses having similar functions is described as distinguished from the others, a lower-case alphabetic letter is attached to the reference numeral denoting the apparatus. For example, control terminals 20a to 20c, which are apparatuses having similar functions, will be referred to as control terminals 20 when a common description is given about them. Although the letters "a" to "c" and the like are attached to reference numerals for convenience, these letters represent an arbitrary number, and the number is not limited thereto.

The equipment management system 1 is a system in which a single management apparatus 30 manages many pieces of equipment. Here, the management apparatus 30 is installed in a central management center 3. There are many facilities 2a to 2c in a jurisdiction area of the central management center 3. The facilities 2a to 2c are, for example, an office building, a commercial building, and a condominium. One or a plurality of air conditioners 10a to 10f, which are an example of equipment to be managed, are installed in each of the facilities 2a to 2c. Each of the air conditioners 10a to 10f is connected to any of the plurality of control terminals 20a and 20b. Each of the control terminals 20a and 20b and the management apparatus 30 communicate equipment information, which will be described below, so that the plurality of air conditioners 10a to 10f are managed.

The management apparatus 30 connects to a plurality of monitoring terminals 40a to 40c and a plurality of maintenance terminals 50a and 50b through a network. When an anomaly notice is detected from any of the air conditioners 10a to 10f, the management apparatus 30 notifies an operator or the like of the monitoring terminals 40a to 40c or the maintenance terminals 50a and 50b that the anomaly notice has been detected.

(2) Target (Equipment) to be Managed in Equipment Management System 1

Hereinafter, an "air conditioner" will be described as an example of equipment which is a target to be managed in the equipment management system 1 according to this embodiment. Note that the target to be managed in the equipment management system 1 according to this embodiment is not limited to an air conditioner, and any equipment having the following characteristics can be adopted. For example, a ventilator or the like may be adopted as the equipment.

Figure 2:
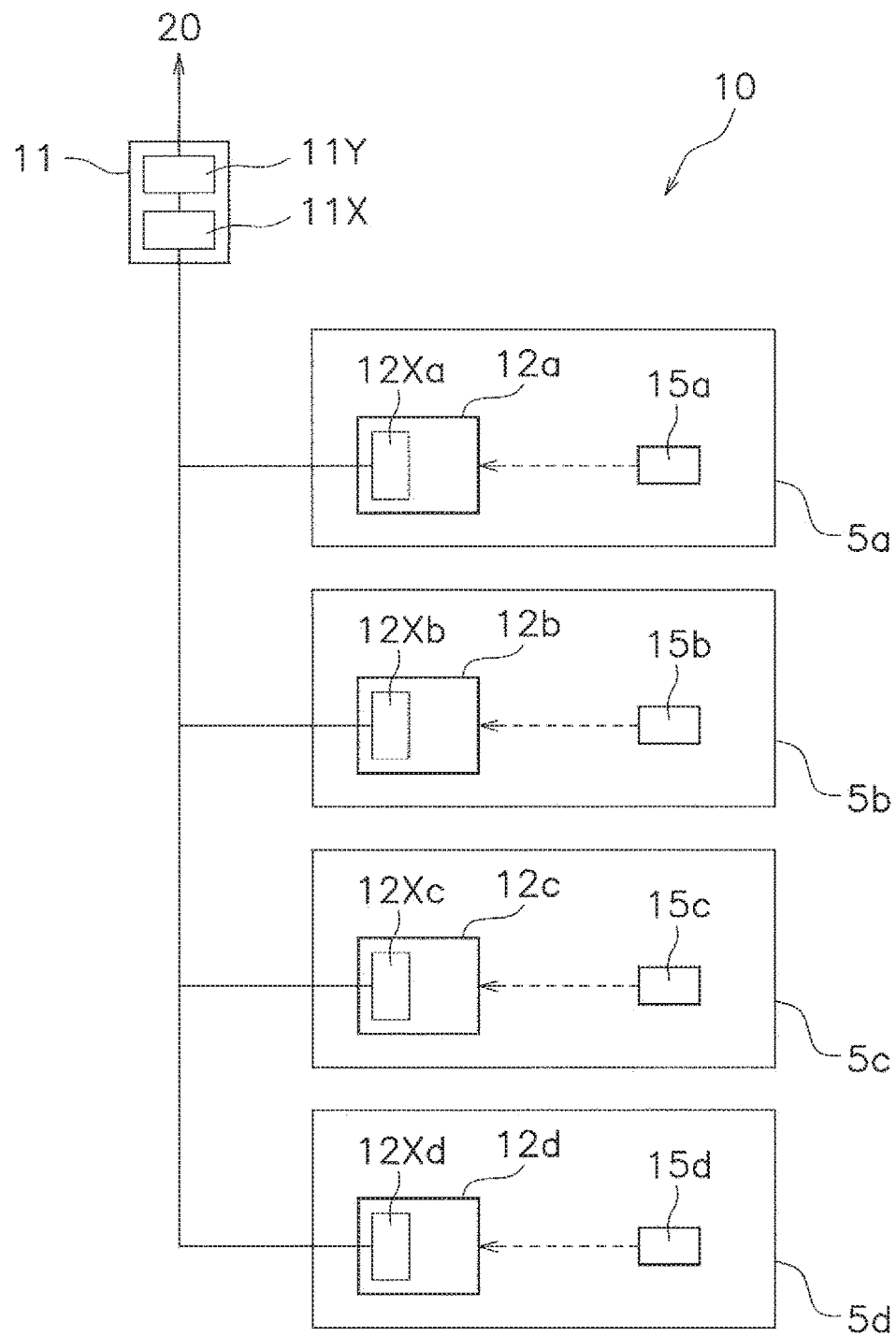
FIG. 2 is a schematic diagram illustrating the configuration of an air conditioner 10 according to the embodiment.

FIG. 2 is a schematic diagram illustrating the configuration of the air conditioner 10 according to this embodiment. The air conditioner 10 includes a refrigerant circuit consisting of a compressor, a heat exchanger, and the like which are not illustrated. The air conditioner also includes an outdoor unit 11 and a plurality of indoor units 12a to 12d connected to the outdoor unit 11 through dedicated communication lines. The outdoor unit 11 includes an outdoor unit control circuit 11X. The indoor units 12a to 12d include indoor unit control circuits 12Xa to 12Xd, respectively. In addition, the air conditioner 10 has various sensors appropriately attached to predetermined positions. These sensors detect a room temperature, an ambient outside temperature, a discharge temperature and discharge pressure of refrigerant, and so forth. On the basis of detected values of the various sensors, the outdoor unit control circuit 11X and the indoor unit control circuits 12X cooperate with each other to control the operations of individual parts of the air conditioner 10. The air conditioner 10 is operated on the basis of control information input into an operation terminal 15, such as a remote controller and/or an operation panel, and control information received from the external monitoring terminal 40 through the network.

The outdoor unit 11 is equipment that functions as a heat source of the refrigerant circuit. The outdoor unit 11 includes a connection unit 11Y mounted therein. Information is transmitted and received between the control terminal 20, which will be described below, and the outdoor unit control circuit 11X via the connection unit 11Y. The outdoor unit 11 is installed outside a building of the facility 2, for example, on the roof of the building.

The indoor unit 12 connects to the outdoor unit 11 through a dedicated communication line. The indoor unit 12 is operated by the operation terminal 15 installed indoors. The operation terminal 15 is constituted by, for example, a remote controller and an operation panel or the like attached indoors. Here, the plurality of indoor units 12a to 12d connected to the single outdoor unit 11 are operated while individually being associated with one or a plurality of operation terminals 15. In addition, a human detection sensor or the like that detects the presence of a person may be mounted on the indoor unit 12. The indoor units 12a to 12d are installed in installation spaces 5a to 5d, such as a plurality of floors or a plurality of rooms of the facility 2, in a dispersed manner.

(3) Detailed Configuration of Equipment Management System 1

Figure 3:
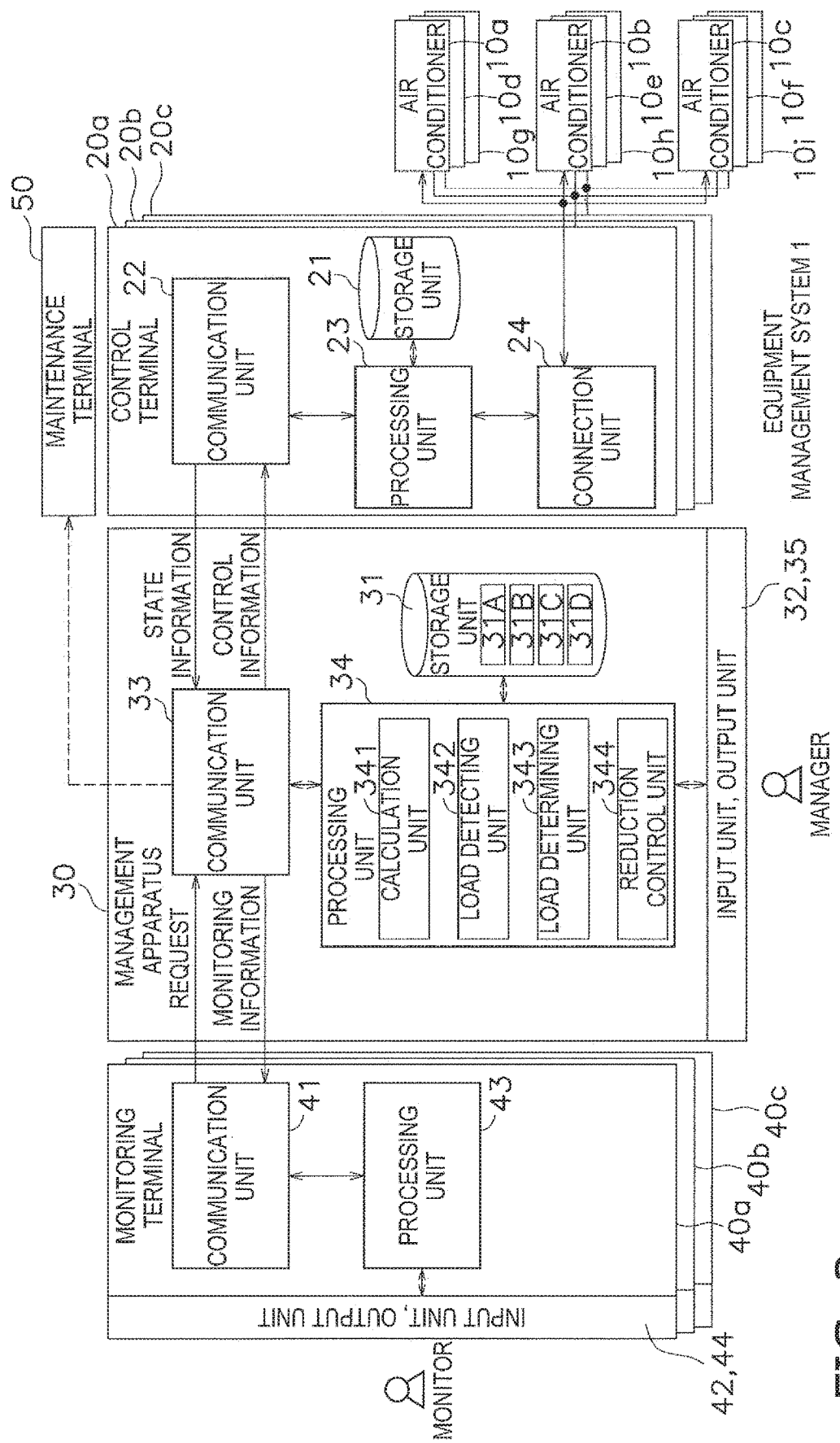
FIG. 3 is a schematic diagram illustrating the functional blocks of individual apparatuses constituting the equipment management system 1 according to the embodiment.

FIG. 3 is a schematic diagram illustrating the functional blocks of the individual apparatuses constituting the equipment management system 1 according to this embodiment.

(3-1) Control Terminal

The control terminal 20 connects to the outdoor unit control circuit 11X of the outdoor unit 11 of the air conditioner 10, thereby controlling the air conditioner 10. As illustrated in FIG. 3, the control terminal 20 includes a storage unit 21, a communication unit 22, a processing unit 23, and a connection unit 24. In FIG. 3, lower-case alphabetic letters for reference numerals of individual components of the control terminal 20a are omitted for convenience.

The storage unit 21 stores various pieces of information and is constituted by a nonvolatile memory, a volatile memory, and the like. For example, the storage unit 21 stores a program for executing various functions of the control terminal 20. The storage unit 21 also stores "communication conditions" and so forth of "equipment information" that is transmitted and received between the control terminal 20 and the management apparatus 30.

"Equipment information" is a plurality of types of information about the air conditioner (equipment) 10, which is a target to be managed, and is broadly classified into, for example, "state information" indicating the state of the air conditioner 10 and "control information" for controlling various states of the air conditioner 10. "State information" is classified into first state information D1, second state information D2, and third state information D3 in descending order of priority. The first state information D1 has the highest priority and is information such as an anomaly notice indicating that a serious anomaly has occurred in the equipment. The second state information D2 has the second highest priority and is information such as control information for an electrically operated valve, a motor, and other actuators belonging to the air conditioner 10 and detected values or the like obtained by various sensors installed in the air conditioner 10. The third state information D3 has the third highest priority and is information for obtaining the characteristics of a user, for example, a history of the operation frequency of the operation terminal 15. The classification of individual pieces of state information is not limited to the one described above and can be arbitrarily set by a manager or the like.

The storage unit 21 stores communication conditions for the plurality of types of state information in association with the individual air conditioners. Specifically, a "communication condition" specifies whether or not the transmission of state information from the individual air conditioners 10a to 10f is to be suppressed, and is information whose concept is illustrated in FIG. 4A and FIG. 4B, for example. In the example illustrated in FIG. 4A and FIG. 4B, the control terminal 20a is associated with the air conditioners 10a to 10c. It is indicated that, under a first communication condition A1, all the air conditioners 10a, 10b, and 10c are able to transmit the first state information D1, the second state information D2, and the third state information D3 to the management apparatus 30. It is also indicated that, under a second communication condition A2, all the air conditioners 10a, 10b, and 10c are able to transmit only the first state information D1 to the management apparatus 30. In other words, the storage unit 21 stores, as the second communication condition A2, the state information D2 and the state information D3 for which the amount of communication is to be decreased among the plurality of types of state information D1 to D3 in association with each of the air conditioners 10a to 10c (equipment). The communication conditions specify conditions about various communications in addition to the above-described conditions, for example, communication intervals that are based on the type of state information and each of the air conditioners 10a to 10c. The communication conditions stored in the storage unit 21 can be updated on the basis of control information from the management apparatus 30, which will be described below.

The communication unit 22 communicates with an external network. With use of the function of the communication unit 22, various commands and various data are transmitted and received between the control terminal 20 and the management apparatus 30.

The processing unit 23 executes various information processing operations. The processing unit 23 controls, via the communication unit 22, the communication between the control terminal 20 and the management apparatus 30. For example, the processing unit 23 transmits equipment information (state information) obtained from the outdoor unit 11 connected to the control terminal 20 to the management apparatus 30 at a predetermined communication interval. When receiving a reduction control notification as equipment information (control information) from the management apparatus 30, the processing unit 23 suppresses communication of part of a plurality of pieces of equipment information (state information). The processing unit 23 updates the communication conditions stored in the storage unit 21 in response to a request from the management apparatus 30.

The connection unit 24 connects to the connection unit 11Y of the outdoor unit 11. The control terminal 20 is able to transmit instruction information to the outdoor unit control circuit 11X and to obtain state information from the outdoor unit control circuit 11X via the connection unit 24.

(3-2) Management Apparatus

The management apparatus 30 connects to each of the control terminal 20 and the monitoring terminal 40 through the network and manages the operation states or the like of a plurality of air conditioners 10a to 10i. As illustrated in FIG. 3, the management apparatus 30 includes a storage unit 31, an input unit 32, a communication unit 33, a processing unit 34, and an output unit 35.

The storage unit 31 stores various pieces of information and is constituted by a cache memory, a hard disk, and the like. Here, the storage unit 31 includes a centralized management database 31A, a state information database 31B, a control information database 31C, and a communication condition database 31D. In addition, the storage unit 31 stores a program for executing various functions of the management apparatus 30.

The centralized management database 31A stores information related to the plurality of air conditioners 10a to 10i managed by the management apparatus 30. For example, the centralized management database 31A stores information on the facility 2 in which the individual air conditioners 10a to 10i are installed, information on the outdoor unit 11 and the installation spaces 5a to 5d of the indoor units 12a to 12d in the facility 2, information on a monitor of each air conditioner 10, and the like.

The state information database 31B stores, in association with the individual air conditioners 10a to 10i, various pieces of state information transmitted from the control terminal 20.

The control information database 31C stores control information for the individual air conditioners 10a to 10i input by a manager who operates the management apparatus 30, control information for responding to requests to the individual air conditioners 10a to 10i from the monitoring terminal 40, which will be described below, and the like.

The communication condition database 31D stores, in association with the monitoring terminal 40. "communication conditions" for the individual air conditioners 10a to 10i (equipment) connected to the individual control terminals 20a to 20c and the types of individual pieces of state information D1 to D3. The information stored in the communication condition database 31D includes information on communication conditions stored in the storage units 21a to 21c of the individual control terminals 20a to 20c (the information illustrated in FIG. 4A and FIG. 4B described above). Thus, with use of the communication condition database 31D, the communication conditions of the individual control terminals 20a to 20c can be changed via the management apparatus 30.

The storage unit 31 is capable of storing arbitrary information in addition to the above-described various databases.

The input unit 32 enables information to be input to the management apparatus 30 and is constituted by a keyboard, a mouse, and/or a touch screen or the like. For example, the input unit 32 enables information to be input to various reception screens. Thus, the manager is able to input control information for each air conditioner 10 and to input information for changing various settings via the input unit 32. In particular, the manager is able to set a threshold value for reduction control, which will be described below, via the input unit 32.

The communication unit 33 is an interface for communicating with the control terminal 20 and the monitoring terminal 40. Specifically, the communication unit 33 receives state information from the control terminal 20. The communication unit 33 transmits control information to the control terminal 20. The communication unit (receiving unit) 33 receives a "request" about the air conditioner 10 (equipment) from the monitoring terminal 40. The communication unit 33 transmits monitoring information to the monitoring terminal 40. The equipment information and the request received by the communication unit 33 are stored in the storage unit 31.

The processing unit 34 executes various information processing operations in the management apparatus 30 and is constituted by a CPU, a cache memory, and the like. Here, the processing unit 34 has functions as a calculation unit 341, a load detecting unit 342, a load determining unit 343, and a reduction control unit 344.

The calculation unit 341 executes calculation of information processing that is based on information received by the communication unit 33. For example, the calculation unit 341 generates various pieces of management information and the like in accordance with the state information transmitted from the control terminal 20. In addition, the calculation unit 341 executes processing in response to a request from the monitoring terminal 40 and generates monitoring information or the like indicating a processing result.

The load detecting unit 342 detects a load of calculation of the information processing by the calculation unit 341. Specifically, the load detecting unit 342 detects a load of the information processing in the calculation unit 341 on the basis of any one of or an arbitrary combination of memory usage, CPU load, network load, and the amount of access from an external system.

The load determining unit 343 determines whether or not the load detected by the load detecting unit 342 is above a threshold value. The load determining unit 343 also determines, after a predetermined time elapses from when the load determining unit 343 determines that the load is above the threshold value, whether or not the load is below the threshold value. These determination results are transmitted to the reduction control unit 344.

The reduction control unit 344 executes "reduction control" to reduce the load on the calculation unit 341 if the load determining unit 343 determines that the load is above the threshold value. Here, "reduction control" is control to reduce the load of calculation in the calculation unit 341. For example, the reduction control is executed by changing the "communication condition" between the management apparatus 30 and the control terminal 20. In addition, a plurality of types of state information (equipment information) related to the plurality of air conditioners 10a to 10i are transmitted to the management apparatus 30 from the individual control terminals 20a to 20c. Thus, the management apparatus 30 suppresses communication of part of the plurality of types of state information, thereby executing reduction control.

The reduction control unit 344 cancels reduction control if the load determining unit 343 determines, after the predetermined time elapses from when the load determining unit 343 determines that the load is above the threshold value, that the load is below the threshold value. In the case of executing reduction control, the reduction control unit 344 transmits a "reduction control notification" indicating that reduction control is to be executed to the control terminal via the communication unit 33. In the case of canceling reduction control, the reduction control unit 344 transmits a "cancellation notification" indicating that reduction control is to be canceled to the control terminal 20 via the communication unit 33.

The output unit 35 outputs various pieces of information and is constituted by a display and speaker or the like of various types. For example, the output unit 35 outputs an input screen or the like for receiving input of a threshold value for reduction control. The various pieces of information output by the output unit 35 can also be output to the monitoring terminal 40 and the maintenance terminal 50 through the network. For example, an anomaly notice output by the output unit 35 is also output to the maintenance terminal 50 that is registered in advance.

(3-3) Monitoring Terminal

The monitoring terminal 40 is associated with any of the control terminals 20 and transmits various "requests" related to the air conditioners 10 (equipment) belonging to the control terminal 20 to the management apparatus 30. The monitoring terminal 40 monitors the states of the air conditioners 10 on the basis of monitoring information transmitted from the management apparatus 30. The monitoring terminal 40 is operated by, for example, a monitor authorized to execute various control operations on the air conditioners 10.

The monitoring terminal 40 includes a communication unit 41, an input unit 42, a processing unit 43, and an output unit 44. The communication unit 41 connects to the management apparatus 30 through the network and transmits a request related to the air conditioner 10 to the management apparatus 30. The input unit 42 receives the request to be transmitted to the management apparatus 30. The processing unit 43 executes various information processing operations in the monitoring terminal 40. The output unit 44 outputs monitoring information or the like received from the management apparatus 30.

With the above-described configuration, the monitoring terminal 40 is able to transmit requests for executing various operations, such as a heating operation and a cooling operation, to the air conditioners 10. The monitoring terminal 40 is also able to output monitoring information indicating processing results for the requests. The monitoring terminal 40 is also able to transmit responses to various inquiries from the management apparatus 30 via the output unit 44.

The monitor corresponds to an owner of the facility 2, a manager of the facility 2, a user of the facility 2, a manufacturer of the air conditioners 10, a seller of the air conditioners 10, or the like. The right given to the monitor varies according to the type of the monitor. Thus, the types of requests that can be input to the air conditioners 10 vary according to the authorization levels given to the individual monitoring terminals 40. In accordance with the authorization level of the monitoring terminal 40, change in the communication interval is permitted in some of a plurality of items of equipment information, and change in the communication interval is not permitted in some of the plurality of items of equipment information. The setting information for the authorization levels is stored in the centralized management database 31A of the management apparatus 30.

(3-4) Maintenance Terminal

The maintenance terminal 50 is a terminal operated by a maintenance worker of the air conditioners 10. The maintenance terminal 50 receives an anomaly notice from the management apparatus 30. Accordingly, the maintenance worker is able to perform anomaly diagnosis, repairs, and the like on the air conditioner 10 in which the anomaly notice has been detected.

(4) Reduction Control in Equipment Management System 1

Figure 5:
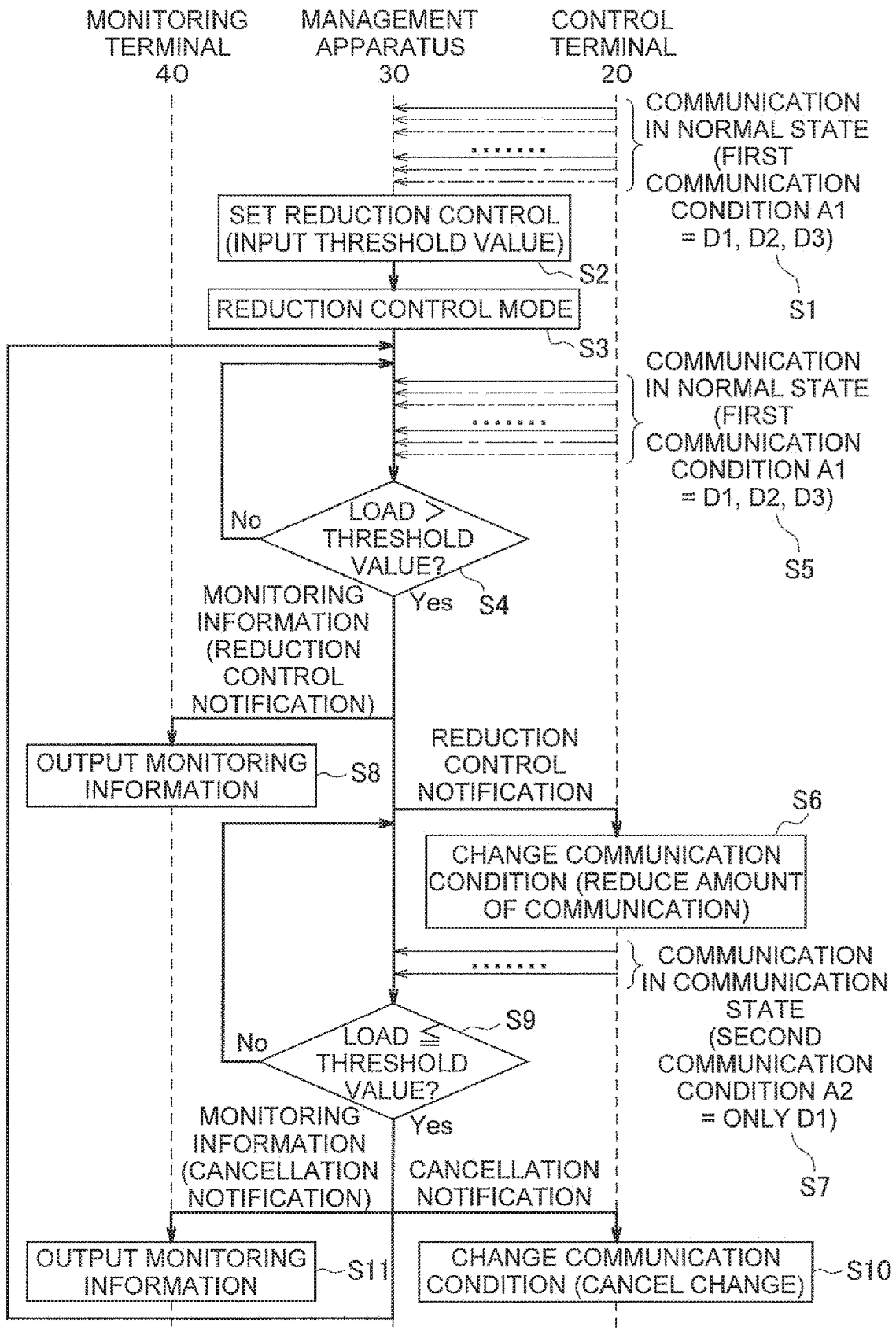
FIG. 5 is a sequence diagram for describing reduction control in the equipment management system 1 according to the embodiment.

FIG. 5 is a sequence diagram for describing reduction control in the equipment management system 1 according to this embodiment.

As a precondition, in a "normal state" before reduction control is executed, the management apparatus 30 and the control terminal 20 communicate a plurality of types of equipment information under a predetermined communication condition. For example, in the "normal state", the control terminal 20a transmits, regarding the air conditioner 10a, the first state information D1, the second state information D2, and the third state information D3 to the management apparatus 30 under the first communication condition A1 (S1).

Under this precondition, the equipment management system 1 according to this embodiment executes "reduction control" to reduce the load of information processing by the calculation unit 341 of the management apparatus 30. Specifically, at the time of executing reduction control, a threshold value for the load of calculation by the calculation unit 341 of the management apparatus 30 is input via the input unit 32 of the management apparatus 30 (S2). Accordingly, the management apparatus 30 enters a reduction control mode (S3).

After the management apparatus 30 enters the reduction control mode, the load detecting unit 342 detects the load of information processing in the calculation unit 341 of the management apparatus 30 at any time. The load determining unit 343 of the management apparatus 30 determines, at any time, whether or not the load of information processing in the calculation unit 341 of the management apparatus 30 is above the threshold value (S4). If the load determining unit 343 determines that the load of information processing in the calculation unit 341 is above the threshold value, the reduction control unit 344 of the management apparatus 30 decides to execute reduction control (Yes in S4). If the load determining unit 343 determines that the load of information processing in the calculation unit 341 is not above the threshold value, the communication between the control terminal 20a and the management apparatus 30 is continued under the first communication condition A1 in the normal state (No in S4, S5).

When reduction control is executed by the reduction control unit 344, a "reduction control notification" indicating that reduction control is to be executed is transmitted from the management apparatus 30 to the control terminal 20.

In response to receipt of the reduction control notification, the control terminal 20 changes the communication condition of the communication between the control terminal 20 and the management apparatus 30 (S6). For example, in the example of communication conditions illustrated in FIG. 4A and FIG. 4B, the communication condition of the communication between the control terminal 20 and the management apparatus 30 is changed from the first communication condition A1 to the second communication condition A2. Accordingly, the control terminal 20 transmits only the first state information D1 to the management apparatus 30 at a predetermined communication interval or the like, and stops transmitting the second state information D2 and the third state information D3 (S7). Hence, the amount of communication of transmission from the control terminal 20 to the management apparatus 30 is reduced, and thus the load of information processing in the calculation unit 341 of the management apparatus 30 is reduced.

The management apparatus 30 transmits monitoring information including the reduction control notification to the monitoring terminal 40 (S8). This enables a monitor or the like who uses the monitoring terminal 40 to recognize the execution of reduction control.

After that, the load determining unit 343 of the management apparatus 30 determines, at any time, whether or not the load of information processing by the calculation unit 341 is smaller than or equal to the threshold value (S9). While it is not determined that the load of information processing by the calculation unit 341 is smaller than or equal to the threshold value, communication is continued under the suppressed communication condition (No in S9, S6). On the other hand, if the load determining unit 343 of the management apparatus 30 determines that the load of information processing by the calculation unit 341 is smaller than or equal to the threshold value, the reduction control unit 344 decides to cancel the reduction control (Yes in S9). Specifically, it is decided to change the communication condition between the control terminal 20a and the management apparatus 30 from the second communication condition A2 to the first communication condition A1. Subsequently, a "cancellation notification" indicating that the reduction control has been canceled is transmitted from the management apparatus 30 to the control terminal 20.

In response to receipt of the cancellation notification, the control terminal 20 returns the communication condition between the control terminal 20 and the management apparatus to the normal state (S10).

Also, if it is decided to cancel the reduction control, monitoring information including the cancellation notification is transmitted from the management apparatus 30 to the monitoring terminal 40 (S11). This enables the monitor or the like who operates the monitoring terminal 40 to recognize that the reduction control has been canceled.

The above-described series of steps are executed until an instruction to finish the reduction control is input. The instruction to finish the reduction control is input via the input unit 32 of the management apparatus 30, the input unit 42 of the monitoring terminal 40, and the like.

(5) Characteristics

The IoT system is designed so that the management apparatus can withstand a peak load (for example, International Publication No. 2014/017053 and so forth). For example, auto-scaling may be used so that the management apparatus can withstand a peak load.

However, system design enabling the management apparatus to withstand a peak load may result in excessive specifications or the like of the management apparatus. In addition, use of auto-scaling causes the operation cost of the management apparatus to vary each time, leading to an issue that the cost for system installation is unpredictable.

An object of the present disclosure is to provide a management apparatus capable of withstanding a peak load without increasing the specifications.

5-1

As described above, the equipment management system 1 according to this embodiment includes the control terminals 20a to 20c that is associated with one or more air conditioners (equipment) 10a to 10i to control the one or more air conditioners (equipment) 10a to 10i and that transmit state information (equipment information) related to the air conditioners, the monitoring terminals 40a to 40c that transmit requests related to the air conditioners 10a to 10i and that monitor the states of the equipment, and the management apparatus 30 that connects through the network to each of the control terminals 20a to 20c and the monitoring terminals 40a to 40c. Here, the management apparatus 30 includes the communication unit 33 (receiving unit) and the processing unit 34. The communication unit 33 receives a request and equipment information from the monitoring terminal 40. The processing unit 34 executes various information processing operations in the management apparatus 30.

The processing unit has the functions of the calculation unit 341, the load detecting unit 342, the load determining unit 343, and the reduction control unit 344. The calculation unit 341 executes calculation of information processing that is based on information received by the communication unit 33 (receiving unit). The load detecting unit 342 detects a load of the information processing by the calculation unit 341. The load determining unit 343 determines whether or not the load detected by the load detecting unit 342 is above a threshold value. If the load determining unit 343 determines that the load is above the threshold value, the reduction control unit 344 executes reduction control to reduce the load on the calculation unit 341.

Thus, the management apparatus 30 according to this embodiment executes reduction control if it is determined that the load of calculation of information processing by the calculation unit 341 is above the threshold value, and is thus capable of withstanding a peak load without increasing the specifications. As a result, the construction cost and the operation cost of the management apparatus 30 can be reduced. The cost saved through the reduction control can be distributed to the manager, the monitor, and so forth.

Figure 6:
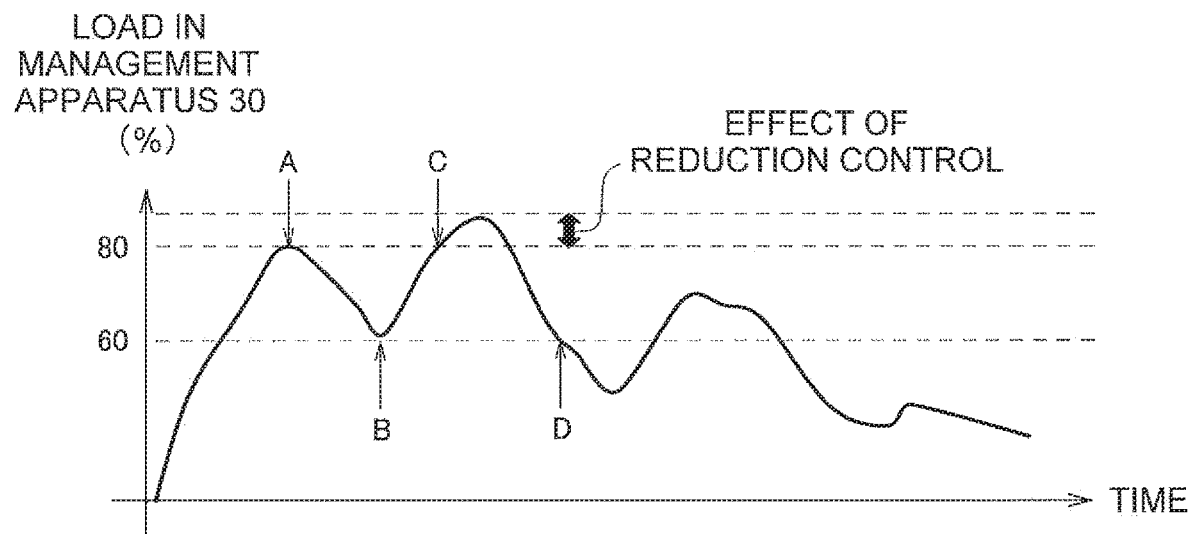
FIG. 6 is a schematic diagram for describing an effect of reduction control in the embodiment.

In addition, when the management apparatus 30 executes reduction control, control is performed so that the load in the management apparatus 30 does not exceed a predetermined upper limit value (80%) as indicated by point A in FIG. 6, for example. Accordingly, a situation can be prevented from occurring where the load of information processing in the management apparatus 30 becomes excessive. Also, control is performed so that the load in the management apparatus 30 does not become smaller than a predetermined lower limit value (60%) as indicated by point B in FIG. 6. Accordingly, a situation can be prevented from occurring where the calculation of information processing in the management apparatus 30 is unnecessarily limited.

If the management apparatus 30 does not execute reduction control, the load on the management apparatus 30 may become excessive as indicated by point C in FIG. 6, which may cause system failure. If the reduction control is continued and is not canceled, execution of information processing is limited more than necessary as indicated by point D and thereafter in FIG. 6, causing a decrease in usage efficiency of the equipment management system 1.

The air conditioners 10 subjected to reduction control are determined on the basis of a contract made in advance or by collecting the air conditioners 10 at each time.

5-2

In the management apparatus 30 according to this embodiment, if it is determined that the load of calculation by the calculation unit 341 is above the threshold value, the reduction control unit 344 changes the communication condition between the management apparatus 30 and the control terminal 20, thereby reducing the load. Here, the control terminal 20 transmits a plurality of types of state information (equipment information) related to the air conditioners 10. If the load of information processing is above the threshold value, the control terminal 20 suppresses communication of part of the plurality of types of state information.

In other words, in the management apparatus 30 according to this embodiment, communication of part of the plurality of types of state information (equipment information) is suppressed if the load of calculation in the calculation unit 341 is above the threshold value, and thus the load on the calculation unit 341 can be reduced. In addition, in the management apparatus 30, the total amount of communication can be reduced while securing communication of highly important equipment information in the plurality of types of state information.

The change in the communication condition can be realized not only by suppressing communication of part of the plurality of types of state information (equipment information) but also by change in the communication interval (regular communication) of each piece of state information, change in communication items, change that is made only when the state changes, change in communication frequency of an anomaly notice (communication when an event occurs), and the like.

5-3

The management apparatus 30 according to this embodiment further includes the input unit 32 for setting a threshold value (threshold value setting unit). Accordingly, a manager who operates the management apparatus 30 is able to adjust the load on the management apparatus 30 based on the communication in the entire equipment management system 1.

5-4

In the management apparatus 30 according to this embodiment, if the load determining unit 343 determines that the load is above the threshold value, the reduction control unit 344 transmits a reduction control notification indicating that reduction control is to be performed to the control terminal 20. Accordingly, reduction control can be executed in the control terminal 20. In other words, if reduction control is the control to change the communication condition between the management apparatus 30 and the control terminal 20, the communication condition of the control terminal 20 can be changed to reduce the load on the processing unit 34.

5-5

In the management apparatus 30 according to this embodiment, after determining that the load of calculation by the calculation unit 341 is above the threshold value, the load determining unit 343 determines, at any time, whether or not the load is below the threshold value. If the load determining unit 343 determines that the load is below the threshold value, the reduction control unit 344 transmits a cancellation notification indicating that reduction control is to be canceled to the control terminal 20. With this configuration, the management apparatus 30 is able to cancel reduction control when the load on the entire equipment management system 1 is not heavy.

5-6

In the management apparatus 30 according to this embodiment, if the load determining unit 343 determines that the load of calculation by the calculation unit 341 is above the threshold value, the reduction control unit 344 transmits a reduction control notification indicating that reduction control is to be performed to the monitoring terminal 40. Subsequently, the reduction control unit 344 executes reduction control when receiving from the monitoring terminal 40 an approval notification indicating approval for the execution of reduction control in response to the transmission of the reduction control notification.

With this configuration, in the management apparatus 30 according to this embodiment, the intention of the monitor or the like who operates the monitoring terminal 40 can be reflected. Specifically, the intention of the monitor or the like is confirmed through display using a graphical user interface (GUI) or notification by email.

5-7

In the management apparatus 30 according to this embodiment, the load detecting unit 342 detects the load of calculation in the calculation unit 341 on the basis of any one of or an arbitrary combination of memory usage, CPU load, network load, and the amount of access from an external system. Thus, the management apparatus 30 is capable of withstanding a peak load without increasing the specifications with respect to the load that is based on these pieces of information.

5-8

The management apparatus 30 according to this embodiment includes the communication condition database 31D that stores, in association with each of the air conditioners 10a to 10i, state information (equipment information) for which communication is to be suppressed in the plurality of types of state information (equipment information). With use of the communication condition database 31D, the management apparatus 30 is able to determine the details of reduction control.

In the management apparatus 30, the communication condition for each of the air conditioners 10a to 10i can be optimized. This realizes the control in which, for example, regarding a period of time during which the operation terminal 15 is frequently operated, a time signal is transmitted to the management apparatus 30 before the period of time, suppression of the communication condition between the control terminal 20 and the management apparatus is relieved during the period of time, batch processing is performed after the period of time, or the like.

(6) Modification Examples (6-1) Modification Example A

In the description given above, the threshold value of reduction control is input in the management apparatus 30, but the configuration of the equipment management system 1 according to this embodiment is not limited thereto. Specifically, the threshold value of reduction control may be set by the monitoring terminal 40. With this configuration, the equipment management system 1 can be provided in which the intention of the monitor or the like who operates the monitoring terminal 40 is reflected. For example, in a case where a communication fee is charged according to the amount of communication in the equipment management system 1, the monitor or the like who operates the monitoring terminal 40 is able to set the amount of communication according to his/her needs. Accordingly, the communication fee charged to the monitor or the like who operates the monitoring terminal 40 can be reduced.

(6-2) Modification Example B

Figure 7:
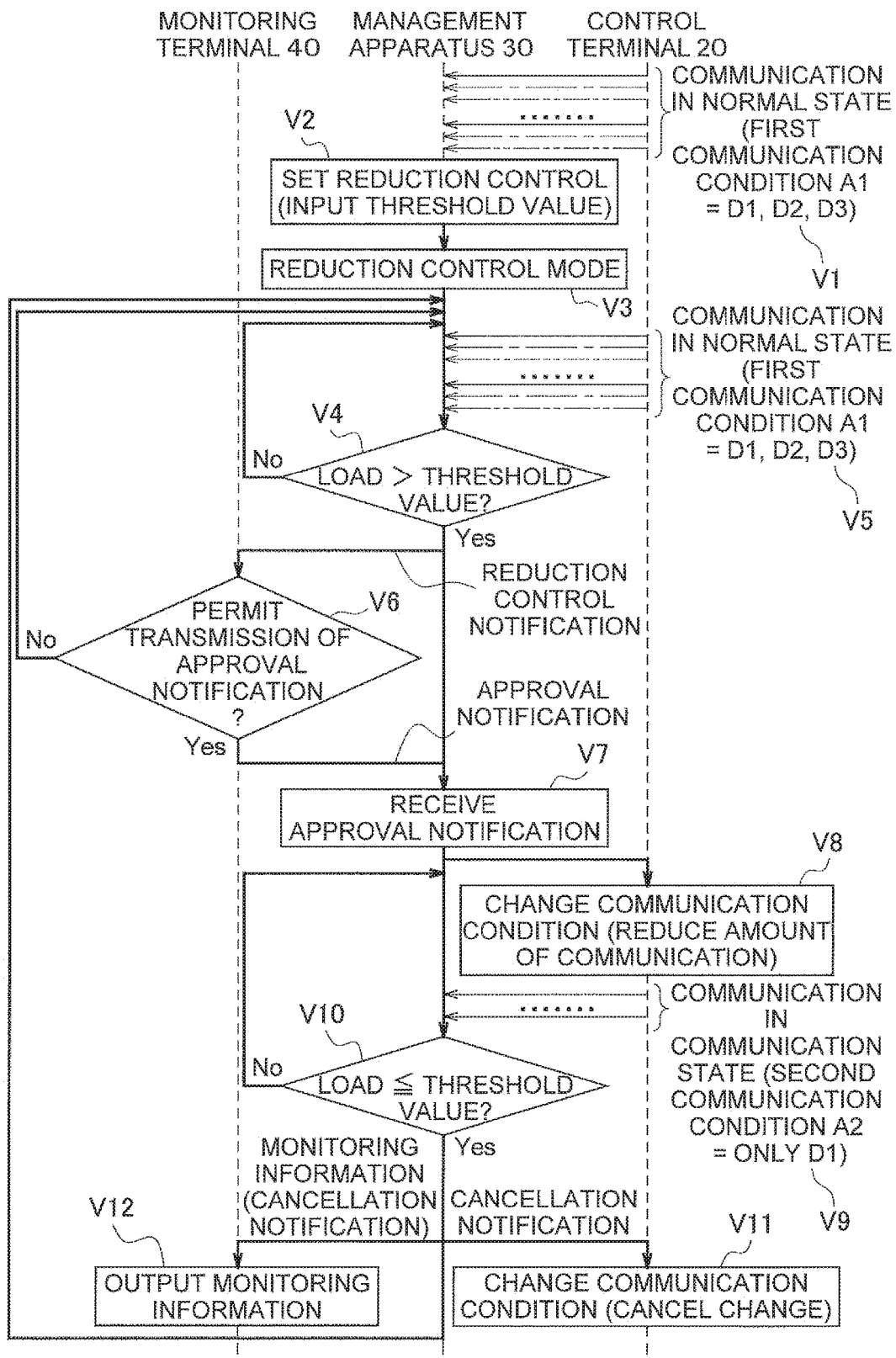
FIG. 7 is a sequence diagram for describing reduction control in the equipment management system 1 according to modification example 1B.

The equipment management system 1 according to this embodiment may be configured to obtain approval by the monitor or the like who operates the monitoring terminal when executing reduction control. Specifically, as illustrated in FIG. 7, the management apparatus 30 transmits a "reduction control notification" to the monitoring terminal 40 (Yes in V4) when deciding to execute reduction control. Accordingly, the monitoring terminal 40 is able to choose whether or not to approve the execution of reduction control in response to receipt of the reduction control notification (V6). Subsequently, if the monitoring terminal chooses to approve the execution of reduction control in response to receipt of the reduction control notification, the monitoring terminal 40 transmits an "approval notification" indicating approval for the execution of reduction control to the management apparatus 30 (Yes in V6). In response to receipt of the approval notification from the monitoring terminal 40, the management apparatus 30 decides to execute reduction control (V7). If the management apparatus 30 does not receive the approval notification from the monitoring terminal 40 within a predetermined period of time, the management apparatus 30 decides not to execute reduction control. Specifically, the management apparatus 30 determines that the load of calculation by the calculation unit 341 is not above the threshold value and continues processing (No in V4).

In FIG. 7, the other steps VI to V5 and V8 to V12 are the same as steps S1 to S5, S6, S7, and S9 to S11 in FIG. 5, respectively.

In the above-described configuration, reduction control is executed when receiving an approval notification from the monitoring terminal 40 in response to the transmission of a reduction control notification, and thus it is possible to provide the equipment management system 1 in which the intension of the monitor or the like who operates the monitoring terminal is reflected.

(6-3) Modification Example C

In the description given above, reduction control is executed by changing the communication condition and suppressing communication of part of the plurality of pieces of state information (equipment information), but the reduction control according to this embodiment is not limited thereto. That is, the reduction control according to this embodiment is realized by arbitrary control to reduce the load of calculation of information processing by the calculation unit 341 of the management apparatus 30.

Specifically, the reduction control unit 344 according to this embodiment may execute reduction control to reduce the load on the calculation unit 341 by limiting a response to a request from the monitoring terminal 40 if the load determining unit 343 determines that the load of information processing by the calculation unit 341 is above the threshold value. For example, when receiving a request from the monitoring terminal 40, the reduction control unit 344 executes processing of, for example, making a high-processing-load application, such as a graphical user interface (GUI), temporarily unavailable, or limiting login in the GUI. Also with this configuration, a response to a request from the monitoring terminal 40 is limited if the load determining unit 343 determines that the load is above the threshold value, and thus it is possible to provide the management apparatus 30 capable of withstanding a peak load without increasing the specifications.

(6-4) Modification Example D

In the equipment management system 1, the management apparatus 30 may have a suggestion function of promoting suggestion of scaling down if the load on the calculation unit 341 of the management apparatus 30 is low over a predetermined period. Furthermore, the suggestion function may promote suggestion of scaling up and scaling out by the management apparatus 30 if the load on the calculation unit 341 of the management apparatus 30 is high over a predetermined period. Furthermore, the suggestion function may add, when making the suggestion, fee information associated therewith.

(6-5) Modification Example E

In the equipment management system 1 according to this embodiment, the intensity of reduction control may be adjusted in multiple stages in accordance with the degree of load on the calculation unit 341. In this equipment management system 1, when it is assumed that there are 100 data items to be transmitted, the 100 items are transmitted when reduction control is not executed (reduction control is "not necessary"). On the other hand, in this equipment management system 1, reduction control is executed such that 80 items are transmitted when the load is "a little heavy", 50 items are transmitted when the load is "heavy", and 20 items are transmitted when the load is "very heavy".

(7) Application Examples

Application examples of the equipment management system 1 according to the embodiment and modification examples described above will be described below. Here, the equipment management system 1 executes reduction control in multiple stages in accordance with a "load level" indicating the load on the calculation unit 341. That is, a plurality of threshold values based on the degrees of load are set, and load levels are defined accordingly. Here, a load level conceptually includes the "degree" in the above-described modification example E. The equipment management system 1 changes the communication condition of equipment information in accordance with the load level and the degree of priority.

For example, as illustrated in FIG. 8, the equipment management system 1 classifies the load level into 1 to 10 (Lv1 to Lv10), and changes the communication condition to any of maintaining a normal communication condition (permit communication), stopping part of the communication condition (stop part of communication), and stopping communication (stop communication), in accordance with the degree of priority (high, middle, low) of each piece of equipment. The degree of priority of each piece of equipment is set in accordance with the type of equipment and/or the type of information obtained from the equipment.

For example, the type of equipment includes, as illustrated in FIG. 9, (a1) the type of air conditioner classified according to the horsepower, (a2) the type of air conditioner classified according to the manufacture date, such as a late model or an old model, and (a3) the type of air conditioner classified according to the installation site, such as a president's room, a meeting room, or a corridor. The type of information obtained from the equipment includes (b1) information classified according to whether a user is a president, a director, or an ordinary employee, (b2) information classified according to whether or not a person exists in the room, (b3) information classified according to an abnormal state, a normal state, or a stop state, (b4) information classified according to a state outside a comfortable area or a state inside the comfortable area, (b5) information classified according to whether a utilization time is during work hours, during overtime hours, or during night, (b6) information classified according to whether an information provider is a building manager or a tenant user, (b7) information classified according to a specific purpose, such as alive monitoring, control having an influence on fee (demand control or the like), or energy-saving control, and so forth.

(7-1) First Application Example

In the following description, an upper-case alphabetic letter X is attached to the reference numeral of the equipment management system 1 in distinction from the other application examples.

Figure 10:
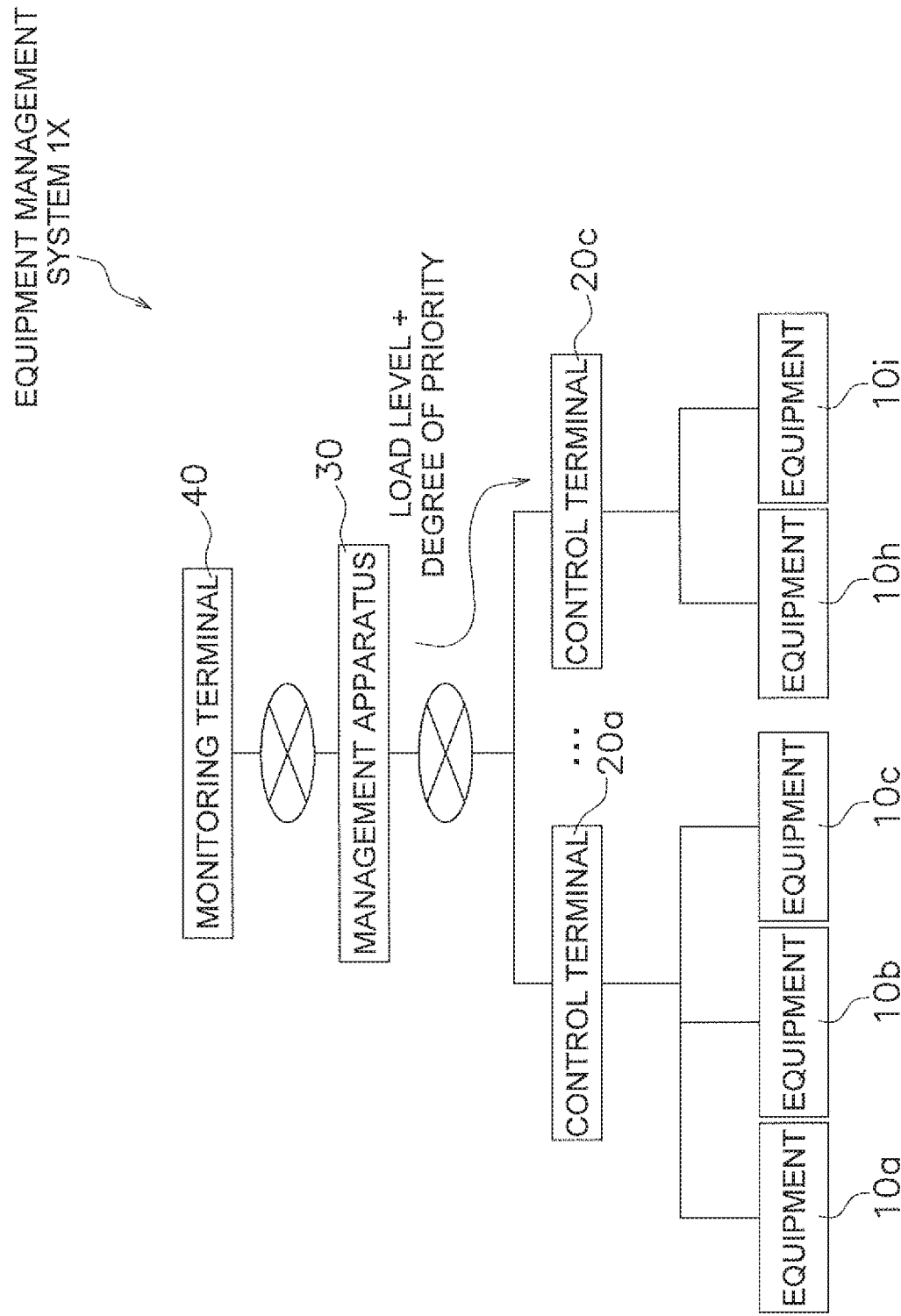
FIG. 10 is a schematic diagram illustrating the concept of an equipment management system 1X according to a first application example.

In an equipment management system 1X according to a first application example, the management apparatus 30 notifies the control terminal 20 of a load level and the degree of priority, as conceptually illustrated in FIG. 10. Subsequently, the control terminal 20 changes the communication condition of equipment information in accordance with the load level and the degree of priority. Here, the storage unit 21 (control-side storage unit) of the control terminal 20 stores the communication conditions that are based on the degree of priority of each piece of equipment set in accordance with the type of equipment and/or the type of information obtained from the equipment as illustrated in FIG. 8 described above.

Figure 11:
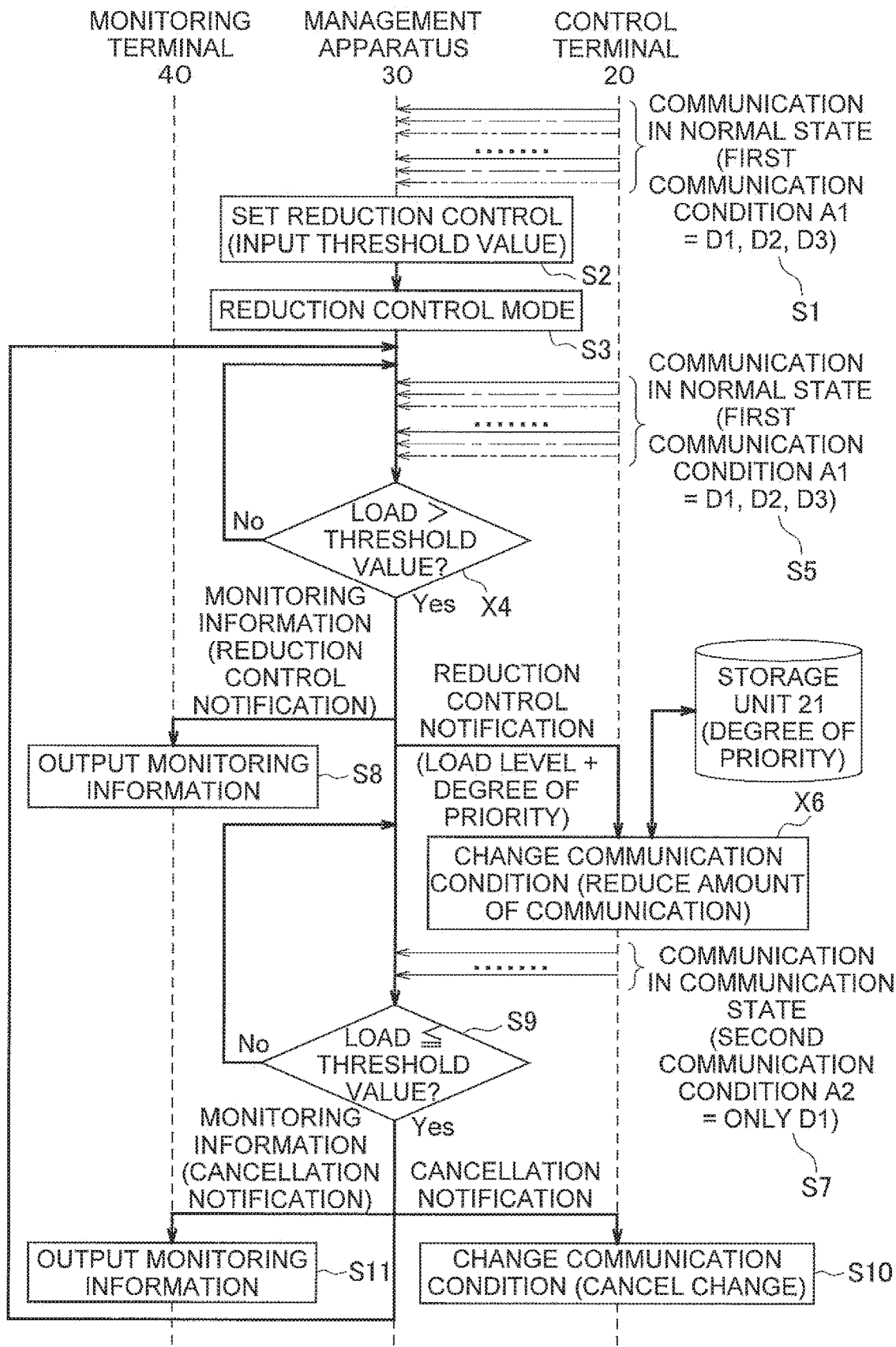
FIG. 11 is a sequence diagram for describing the operation of the equipment management system 1X according to the first application example.

FIG. 11 is a sequence diagram for describing the operation of the equipment management system 1X according to the first application example. Here, step S4 and step S6 in the sequence illustrated in FIG. 5 are replaced with step X4 and step X6, respectively.

Specifically, in the equipment management system 1X according to the first application example, an operation similar to that in step S4 is performed in step X4. That is, the load determining unit 343 of the management apparatus 30 determines, at any time, whether or not the load of information processing in the calculation unit 341 of the management apparatus 30 is above the threshold value. Note that, in step X4, there are a plurality of threshold values, and load levels are set in accordance with the individual threshold values. Thus, reduction control is executed in accordance with a load level.

In the equipment management system 1X according to the first application example, the control terminal 20 changes the communication condition of the communication between the control terminal 20 and the management apparatus 30 in response to receipt of a reduction control notification in step X6 similarly to step S6. Note that, in step X6, a predetermined communication condition is selected from among a plurality of communication conditions, in addition to the first communication condition A1 and the second communication condition A2, in accordance with the load level.

In other words, in response to receipt of the load level and the degree of priority, the control terminal 20 according to the first application example extracts a communication condition stored in the storage unit 21 in accordance with the received load level and degree of priority. Thus, it is possible to provide the equipment management system 1X capable of setting an optimum communication condition only by notifying, by the management apparatus 30, the control terminal 20 of the load level and the degree of priority.

For example, in response to receipt of a notification indicating that the load level is (Lv5) from the management apparatus 30, the control terminal 20 changes the communication condition between the control terminal 20 and the management apparatus 30 to the communication condition illustrated in FIG. 12. That is, as for high-priority equipment or data items, transmission to the management apparatus 30 is permitted. The data items include state information to be transmitted to the management apparatus 30, such as alive monitoring, state monitoring, and trend data, and instruction information for responding to a request from the management apparatus 30. For high-priority data items, a communication condition is set in which the transmission interval is 1 minute and the data accuracy is not decreased from the third decimal place. As for middle-priority equipment or data items, transmission to the management apparatus 30 is partially limited. For middle-priority data items, a communication condition is set in which the transmission interval is 5 minutes and the data accuracy is decreased to integer. As for low-priority equipment or data items, transmission to the management apparatus 30 is stopped.

(7-2) Second Application Example

In the following description, an upper-case alphabetic letter Y is attached to the reference numeral of the equipment management system 1 in distinction from the other application examples.

Figure 13:
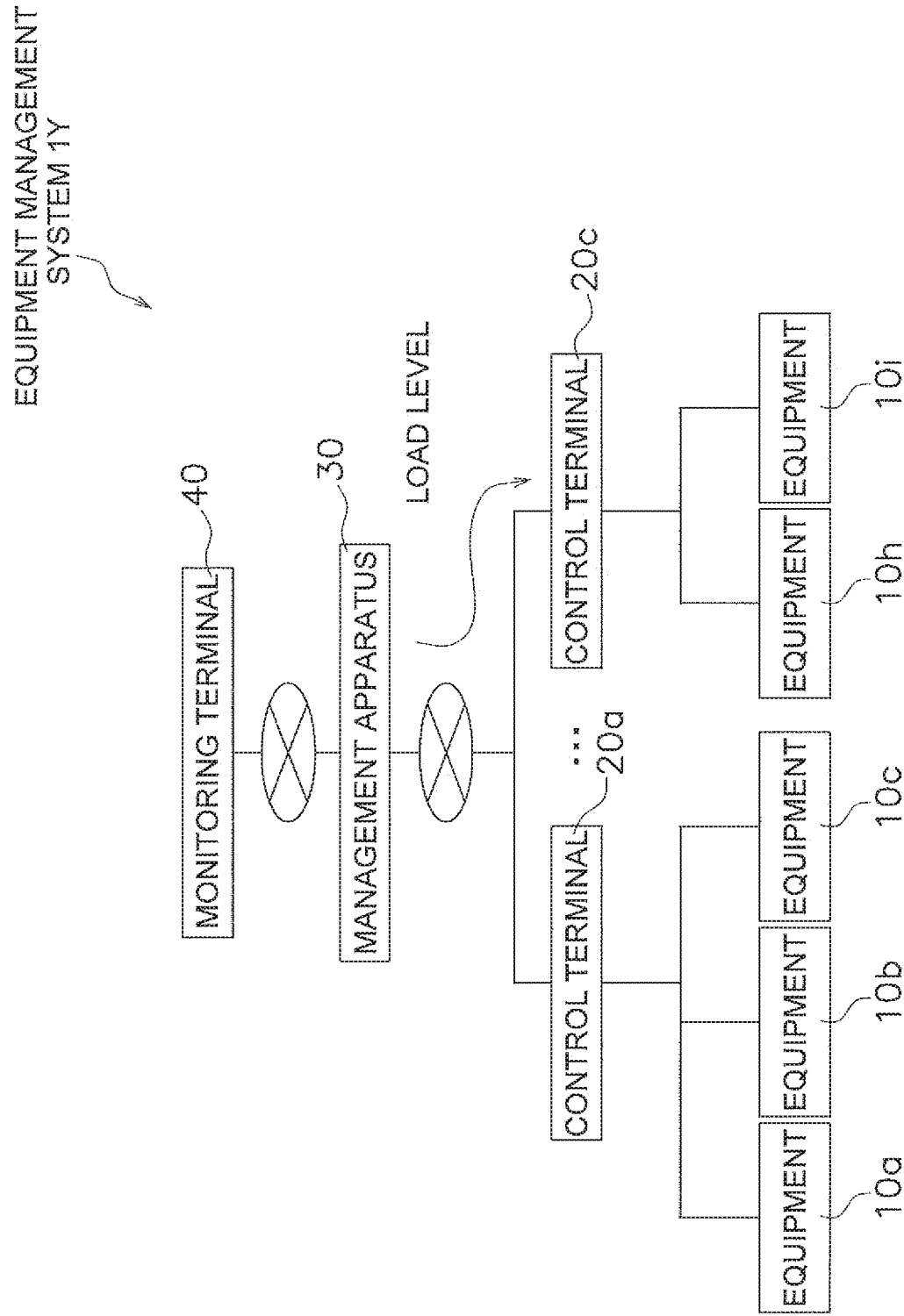
FIG. 13 is a schematic diagram illustrating the concept of an equipment management system 1Y according to a second application example.

In an equipment management system 1Y according to a second application example, the management apparatus 30 notifies the control terminal 20 of only a load level, as conceptually illustrated in FIG. 13. In the second application example, the processing unit (determining unit) 23 determines the degree of priority of the equipment 10 when the control terminal 20 receives the load level. Subsequently, the processing unit (communication condition changing unit) 23 changes, on the basis of the received load level and the determined degree of priority, the communication condition between the management apparatus 30 and the control terminal 20. The degree of priority is determined by the processing unit on the basis of a predetermined condition for each data item. After the degree of priority is determined by the processing unit 23 of the control terminal 20, the information stored in the storage unit 21 (control-side storage unit) of the control terminal 20 is updated. Subsequently, the storage unit 21 of the control terminal stores the communication conditions that are based on the degree of priority of each piece of equipment set in accordance with the type of equipment and/or the type of information obtained from the equipment as illustrated in FIG. 8 described above.

Figure 14:
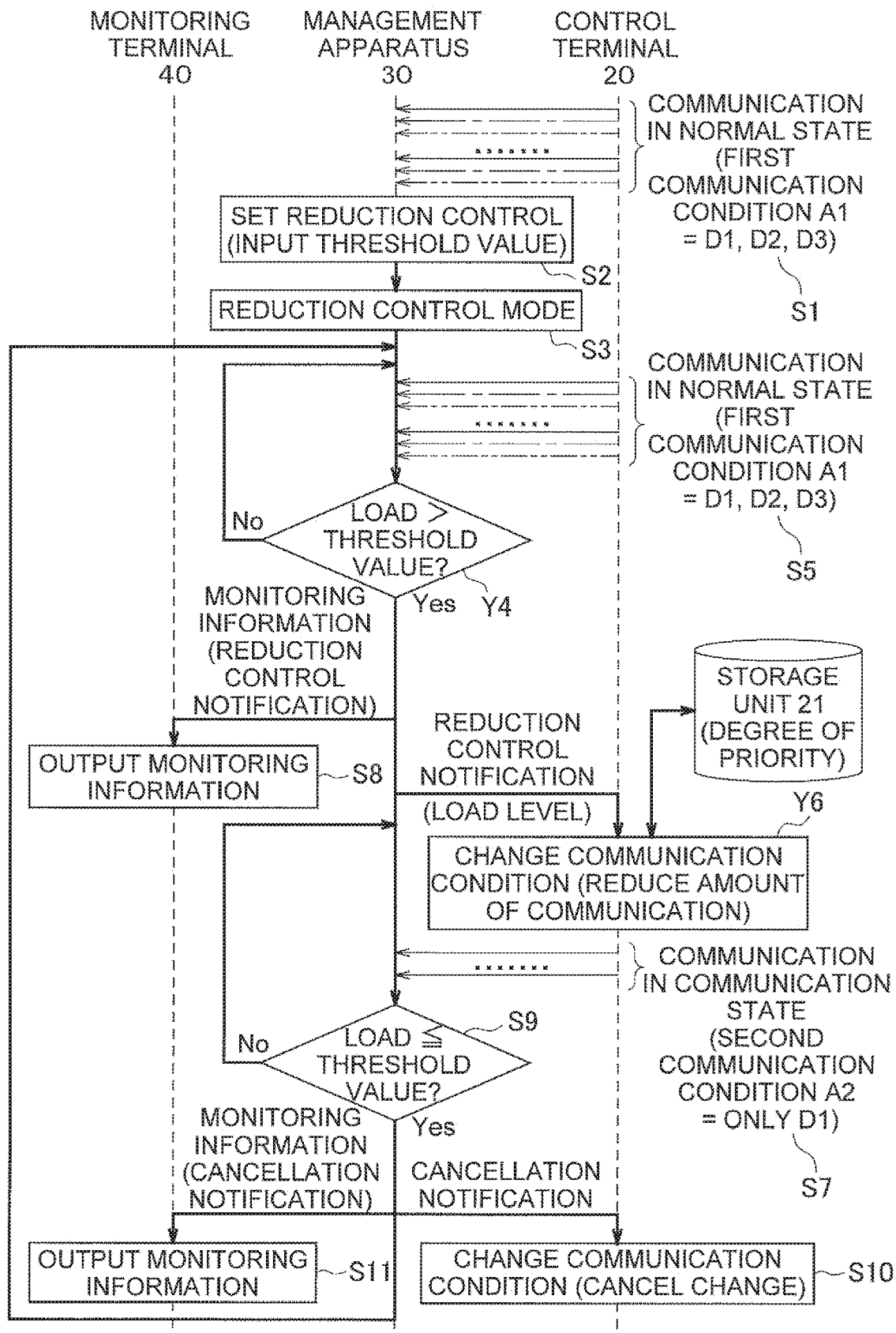
FIG. 14 is a sequence diagram for describing the operation of the equipment management system 1Y according to the second application example.

FIG. 14 is a sequence diagram for describing the operation of the equipment management system 1Y according to the second application example. Here, step S4 and step S6 in the sequence illustrated in FIG. 5 are replaced with step Y4 and step Y6, respectively.

Specifically, in the equipment management system Y according to the second application example, an operation similar to that in step S4 is performed in step Y4. That is, the load determining unit 343 of the management apparatus 30 determines, at any time, whether or not the load of information processing in the calculation unit 341 of the management apparatus 30 is above the threshold value. Note that, in step Y4, there are a plurality of threshold values, and load levels are set in accordance with the individual threshold values. Thus, reduction control is executed in accordance with a load level.

In the equipment management system 1Y according to the second application example, the control terminal 20 changes the communication condition of the communication between the control terminal 20 and the management apparatus 30 in response to receipt of a reduction control notification in step Y6 similarly to step S6. Note that, in step Y6, a predetermined communication condition is selected from among a plurality of communication conditions, in addition to the first communication condition A1 and the second communication condition A2, in accordance with the load level. In addition, in step Y6, the processing unit (determining unit) 23 determines the degree of priority of the equipment 10 when the control terminal 20 receives a load level, and a predetermined communication condition is selected on the basis of the determined degree of priority.

With the above-described configuration, it is possible to provide the equipment management system 1Y capable of setting an optimum communication condition only by notifying, by the management apparatus 30, the control terminal 20 of the load level.

For example, in response to receipt of a notification indicating that the load level is (Lv5) from the management apparatus 30, the control terminal 20 changes the communication condition between the control terminal 20 and the management apparatus 30 to the communication condition illustrated in FIG. 12.

(7-3) Third Application Example

In the following description, an upper-case alphabetic letter Z is attached to the reference numeral of the equipment management system 1 in distinction from the other application examples.

Figure 15:
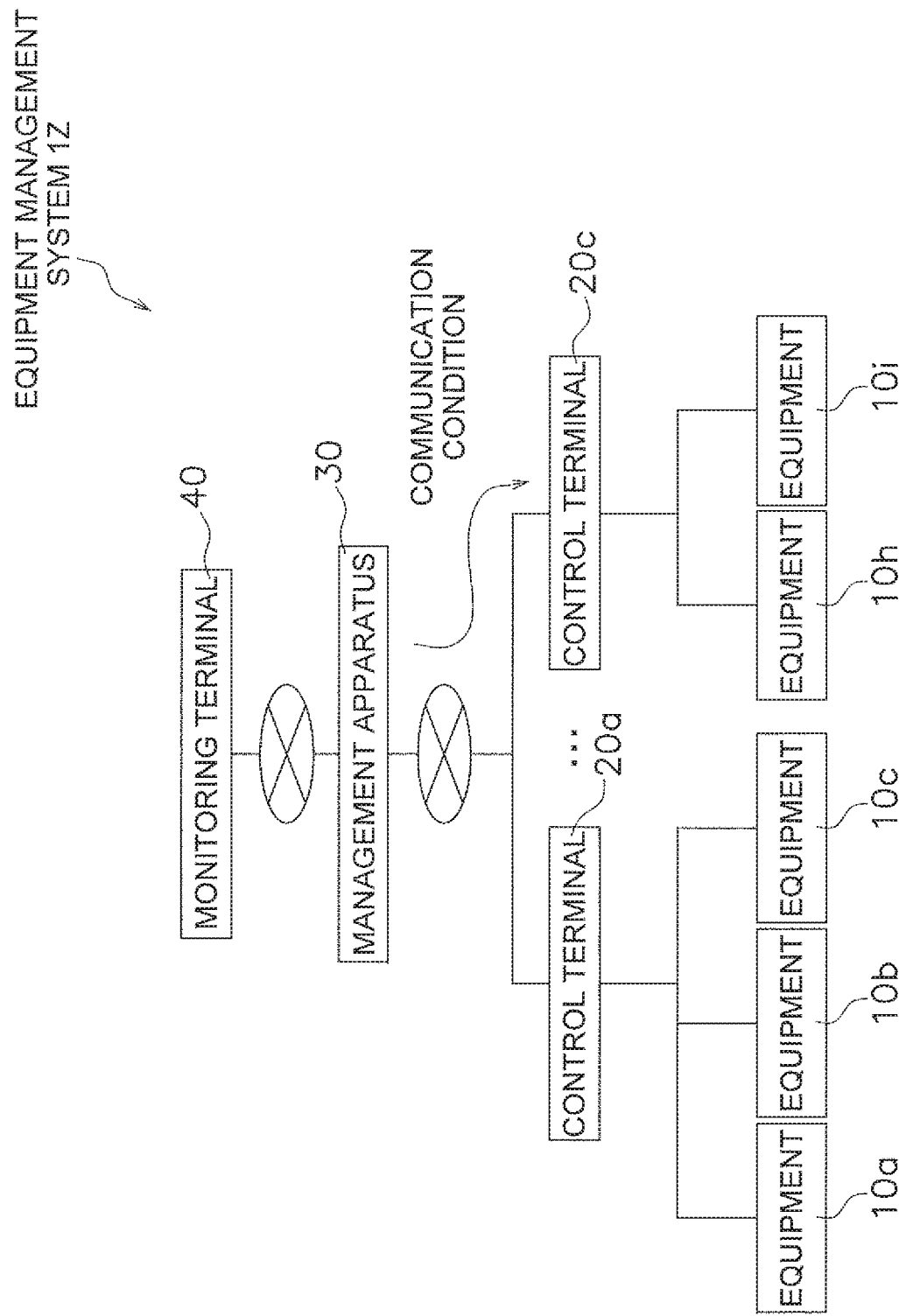
FIG. 15 is a schematic diagram illustrating the concept of an equipment management system 1Z according to a third application example.

In an equipment management system 1Z according to a third application example, the management apparatus 30 notifies the control terminal 20 of a communication condition that is based on a load level and the degree of priority, as conceptually illustrated in FIG. 15. Subsequently, the control terminal 20 changes the communication condition of equipment information to the communication condition received from the management apparatus 30. Here, the storage unit 31 (management-side storage unit) of the management apparatus 30 stores the communication condition that is based on the degree of priority of each piece of equipment set in accordance with the type of equipment and/or the type of information obtained from the equipment as illustrated in FIG. 8 described above. The storage unit 31 also stores detailed information about each piece of equipment (the name of property, installation location, presence information about a person, operation status, the degree of comfort, operation time, and so forth).

Figure 16:
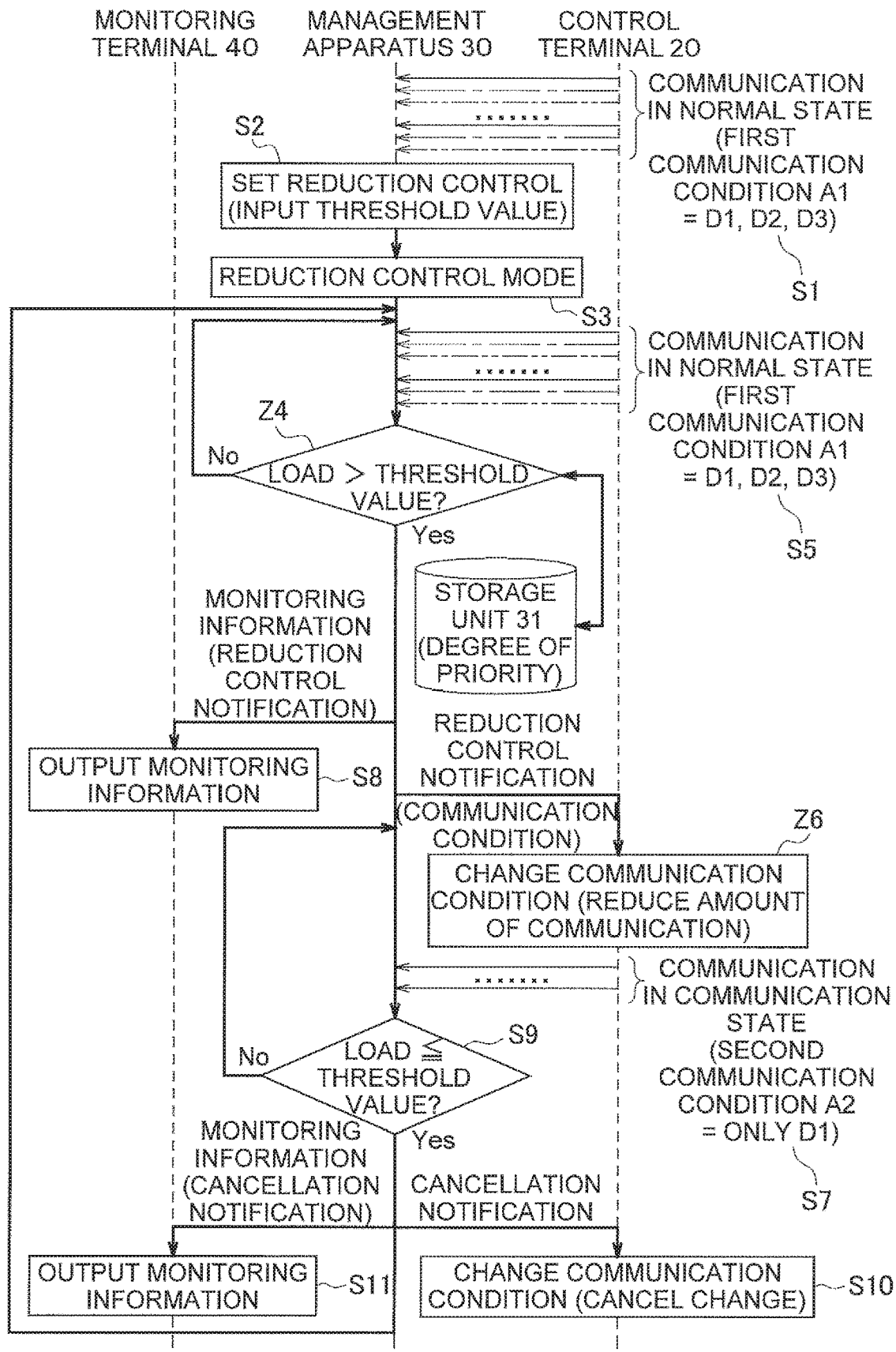
FIG. 16 is a sequence diagram for describing the operation of the equipment management system 1Z according to the third application example.

FIG. 16 is a sequence diagram for describing the operation of the equipment management system 1Z according to the third application example. Here, step S4 and step S6 in the sequence illustrated in FIG. 5 are replaced with step Z4 and step Z6, respectively.

Specifically, in the reduction control according to the third application example, an operation similar to that in step S4 is performed in step Z4. That is, the load determining unit 343 of the management apparatus 30 determines, at any time, whether or not the load of information processing in the calculation unit 341 of the management apparatus 30 is above the threshold value. Note that, in step Z4, there are a plurality of threshold values, and load levels are set in accordance with the individual threshold values. Thus, reduction control is executed in accordance with a load level. Furthermore, in step Z4, the calculation unit 341 determines a communication condition for each piece of equipment 10 on the basis of the degree of priority and load level stored in the storage unit 31.

In the equipment management system 1Z according to the third application example, the control terminal 20 changes the communication condition of the communication between the control terminal 20 and the management apparatus 30 in response to receipt of a reduction control notification in step Z6 similarly to step S6. Note that a predetermined communication condition is selected from among a plurality of communication conditions, in addition to the first communication condition A1 and the second communication condition A2, in accordance with the load level.

In other words, in response to receipt of a communication condition that is based on the load level and the degree of priority, the control terminal 20 according to the third application example sets the communication condition between the management apparatus 30 and the control terminal 20 to the received communication condition. Accordingly, it is possible to provide the equipment management system 1Z capable of reducing the load on the control terminal 20.

For example, if it is determined that the load level is 5 (Lv5), the management apparatus 30 instructs the control terminal 20 to change the communication condition between the control terminal 20 and the management apparatus 30 to the communication condition illustrated in FIG. 12 described above.

At the time of executing reduction control, the management apparatus 30 may set the degree of priority to the equipment 10 stored in the storage unit 31 and may determine a communication condition in accordance with the set degree of priority and the load level.

(7-4) Fourth Application Example

In the equipment management system 1 according to a fourth application example, the management apparatus 30 provides monitoring information to be displayed on the monitoring terminal 40 on the basis of equipment information received from the control terminal 20. When a load level is determined, the management apparatus 30 limits the display items of monitoring information in accordance with the degree of priority of the equipment 10. The display items of monitoring information vary according to the type of monitoring terminal 40. For example, the monitoring terminal 40 is used by a building manager, a data analyzer, an end user, or the like, and the application to be used varies according to a user. Thus, in the equipment management system 1 according to the fourth application example, the display items of monitoring information are limited in accordance with the type of user and determination of the load level, thereby reducing the calculation load in the management apparatus 30. For example, the equipment management system 1 reduces the calculation load in the management apparatus 30 by making a high-processing-load application, such as a graphical user interface (GUI), temporarily unavailable, or limiting login in the GUI, even when a request is made by the monitoring terminal 40.

(7-5) Fifth Application Example

In the equipment management system 1 according to a fifth application example, reduction control is executed by using a method other than the method of changing the communication condition between the management apparatus 30 and the control terminal 20.

For example, the management apparatus 30 provides monitoring information to a monitor through a monitoring application. The monitoring application has an alive monitoring function, an energy, visualization function, a trend data collection function, and an automatic control function.

When it is determined that the load level is 5 (Lv5) in the management apparatus 30, the management apparatus 30 limits the functions of the monitoring application in accordance with the type of the monitor who operates the monitoring terminal 40.

Specifically, as illustrated in FIG. 17, (a) the functions of the monitoring application are limited in the following manner when the monitor is a building manager. That is, the processing of the alive monitoring function related to high-priority equipment is continued, the processing of the alive monitoring function related to middle-priority equipment is partially limited, and the processing of the alive monitoring function related to low-priority equipment is limited. The processing of the energy visualization function related to high-priority equipment is continued, the processing of the energy visualization function related to middle-priority equipment is partially limited, and the processing of the energy visualization function related to low-priority equipment is limited. The processing of the trend data collection function is limited regardless of the degree of priority of equipment. The processing of the automatic control function related to high-priority equipment is partially limited, and the processing of the automatic control function related to middle-priority equipment and low-priority equipment is limited. In addition, (b) the monitoring application is limited in the following manner when the monitor is a data analyzer. That is, the processing of the alive monitoring function related to high-priority equipment is continued, the processing of the alive monitoring function related to middle-priority equipment is partially limited, and the processing of the alive monitoring function related to low-priority equipment is limited. The processing of the energy visualization function is limited regardless of the degree of priority of equipment. The processing of the trend data collection function related to high-priority equipment is continued, the processing of the trend data collection function related to middle-priority equipment is partially limited, and the processing of the trend data collection function related to low-priority equipment is limited. The processing of the automatic control function related to high-priority equipment is partially limited, and the processing of the automatic control function related to middle-priority equipment and low-priority equipment is limited. In addition, (c) the monitoring application is limited in the following manner when the monitor is an end user. That is, the processing of the alive monitoring function related to high-priority equipment is continued, the processing of the alive monitoring function related to middle-priority equipment is partially limited, and the processing of the alive monitoring function related to low-priority equipment is limited. The processing of the energy visualization function related to high-priority equipment is partially limited, and the processing of the energy visualization function related to middle-priority equipment and low-priority equipment is limited. The processing of the trend data collection function is limited regardless of the degree of priority of equipment. The processing of the automatic control function related to high-priority equipment is continued, the processing of the automatic control function related to middle-priority equipment is partially limited, and the processing of the automatic control function related to low-priority equipment is limited.

As illustrated in FIG. 18, the processing load of the monitoring application in the management apparatus 30 is low in the alive monitoring function, slightly low in the automatic control function, slightly high in the trend data collection function, and high in the energy visualization function.

(8) Characteristics

The equipment management system according to this embodiment can be configured by combining all the elements described above and has the following characteristics.

8-1

An equipment management system 1 according to this embodiment includes control terminals 20a to 20c that transmit state information (equipment information) related to air conditioners (equipment) 10a to 10i; and a management apparatus 30 that controls the control terminals 20a to 20c through a network. The management apparatus 30 includes a calculation unit 341, a load determining unit 343, a reduction control unit 344, and a communication unit 33. The calculation unit 341 executes calculation of information processing that is based on information received from the control terminals 20a to 20c. The load determining unit 343 determines a load level corresponding to a load of the information processing by the calculation unit 341. The reduction control unit 344 executes reduction control to reduce the load on the calculation unit 341 in accordance with the load level. The communication unit 33 transmits the load level to the control terminals 20a to 20c. The control terminals 20 to 20c each include a processing unit 23 (communication condition changing unit) that changes, in accordance with the load level, a communication condition of equipment information to be transmitted to the management apparatus 30.

Accordingly, in the equipment management system 1 according to this embodiment, the communication condition between the management apparatus 30 and the control terminals 20a to 20c is changed in accordance with the load level of the management apparatus. Thus, it is possible to provide the equipment management system 1 capable of withstanding a peak load without increasing the specifications.

8-2

In the equipment management system 1 (1X, 1Y) according to this embodiment, the control terminals 20a to 20c each further include a storage unit 21 (control-side storage unit) that stores a degree of priority that is based on a type of the pieces of equipment 10a to 10i and/or a type of information obtained from the pieces of equipment 10a to 10i. The processing unit 23 (communication condition changing unit) of each of the control terminals 20a to 20c changes the communication condition of the equipment information in accordance with the load level and the degree of priority.

Accordingly, in the equipment management system 1 according to this embodiment, the control terminals 20a to 20c change the communication condition between the management apparatus 30 and the control terminals 20a to 20c in accordance with a notification of a load level received from the management apparatus 30, and thus the load on the management apparatus 30 can be reduced.

8-3

In the equipment management system 1 (1Z) according to this embodiment, the management apparatus 30 further includes a storage unit 31 (management-side storage unit) that stores a degree of priority that is based on a type of the pieces of equipment 10a to 10i and/or a type of information obtained from the pieces of equipment 10a to 10i. The communication unit 33 of the management apparatus 30 transmits the degree of priority together with the load level to the control terminals 20a to 20c. In the control terminal 20, the processing unit 23 (communication condition changing unit) changes the communication condition in accordance with the load level and the degree of priority.

Accordingly, in the equipment management system 1 according to this embodiment, the management apparatus 30c determines the communication condition between the management apparatus 30 and the control terminals 20a to 20c. Thus, it is possible to provide an equipment management system centrally managed by the management apparatus 30.

8-4

In the equipment management system 1 according to this embodiment, the pieces of equipment to be managed are the air conditioners 10a to 10i. Accordingly, in the equipment management system 1 according to this embodiment, in the equipment management system 1 that manages the air conditioners, it is possible to provide an equipment management system capable of withstanding a peak load without increasing the specifications.

Note that, in the equipment management system 1 according to this embodiment, the pieces of equipment to be managed are not limited to the air conditioners 10a to 10i.

8-5

In the equipment management system 1 according to this embodiment, the degree of priority of the air conditioner 10 is determined from any one of or an arbitrary combination of an installation status of the air conditioner 10, a usage status (operation state, operation hours, and the like) of the air conditioner 10, an attribute of the air conditioner 10, and a purpose of monitoring the air conditioner 10.

Accordingly, in the equipment management system 1 according to this embodiment, the load on the management apparatus 30 can be reduced on the basis of the above-described pieces of information.

8-6

In the equipment management system 1 according to this embodiment, when the load level is determined, the communication unit 33 of the management apparatus 30 transmits to the control terminal 20, a reduction control notification indicating that the reduction control is to be executed.

Accordingly, in the equipment management system 1 according to this embodiment, the control terminal 20 is capable of changing the communication condition of the control terminal 20 to reduce the load on the processing unit 34 in response to receipt of the reduction control notification.

8-7

In the equipment management system 1 according to this embodiment, the management apparatus 30 suppresses an information processing capability of the calculation unit 341 along with notifying the control terminal 20 of the load level.

Accordingly, in the equipment management system 1 according to this embodiment, the information processing capability of the management apparatus 30 can be suppressed at the time of providing a notification of the load level.

8-8

In the equipment management system 1 according to this embodiment, the management apparatus 30 further includes an input unit (threshold value setting unit) 32 for setting a threshold value corresponding to the load level.

Accordingly, in the equipment management system 1 according to this embodiment, a manager who operates the management apparatus 30 is able to adjust the load on the management apparatus 30 based on communication in the entire equipment management system 1.

8-9

The equipment management system 1 according to this embodiment further includes monitoring terminals 40a to 40c connected to the management apparatus 30 through the network. The threshold value corresponding to the load level is determined by the monitoring terminals 40a to 40c.

Accordingly, in the equipment management system 1 according to this embodiment, the intention of a monitor or the like who operates the monitoring terminals 40a to 40c can be reflected at the time of executing the reduction control.

8-10

In the equipment management system 1 according to this embodiment, the load determining unit 343 of the management apparatus 30 detects the load on the basis of any one of or an arbitrary combination of memory usage amount, CPU load, network load, and an amount of access from an external system.

Accordingly, in the equipment management system 1 according to this embodiment, it is possible to provide an equipment management apparatus capable of withstanding a peak load without increasing the specifications.

8-11

The equipment management system 1 according to this embodiment further includes monitoring terminals 40a to 40c connected to the management apparatus 30 through the network. The management apparatus 30 provides the monitoring terminals 40a to 40c with monitoring information available for display on the monitoring terminals 40a to 40c, on the basis of equipment information received from the control terminal 20. The management apparatus 30 limits a display item of the monitoring information in accordance with the degree of priority of the equipment 10 if the load level is determined.

Accordingly, in the equipment management system 1 according to this embodiment, the load on the management apparatus 30 can be reduced by limiting the display item of the monitoring information in accordance with the load level.

8-12

In the equipment management system 1 according to this embodiment, when the load level is determined, the communication unit 33 of the management apparatus 30 may transmit to the monitoring terminal 40, a reduction control notification indicating that the reduction control is to be executed (see FIG. 7).

Accordingly, a monitor or the like who operates the monitoring terminal 40 can be allowed to recognize that the reduction control is being executed.

8-13

In the equipment management system 1 according to this embodiment, the management apparatus 30 may execute the reduction control when receiving, from the monitoring terminal 40, an approval notification indicating approval for execution of the reduction control in response to transmission of the reduction control notification (see FIG. 7).

Accordingly, the intention of a monitor or the like who operates the monitoring terminal 40 can be reflected in the reduction control of the management apparatus 30.

8-14

In the equipment management system 1 according to this embodiment, the management apparatus 30 limits an information processing capability of the calculation unit along with limiting the display item of the monitoring information.

Accordingly, in the equipment management system 1 according to this embodiment, the load on the calculation unit 341 of the management apparatus 30 can further be reduced.

8-15

In the equipment management system 1 according to this embodiment, the management apparatus 30 may transmit to the control terminal 20, a reduction control notification indicating that the reduction control is to be executed, along with limiting the display item of the monitoring information.

Accordingly, the communication condition of the control terminal 20 can be changed to reduce the load on the calculation unit 341 of the management apparatus 30.

8-16

In the equipment management system 1 according to this embodiment, the management apparatus 30 may limit a request from the monitoring terminal 40 to the equipment 10 along with limiting the display item of the monitoring information.

Accordingly, the load on the management apparatus 30 can be reduced by limiting a request from the monitoring terminal 40 to the equipment 10.

8-17

A management apparatus 30 according to this embodiment controls, through a network, control terminals 20a to 20c that transmit information related to air conditioners 10a to 10i under a communication condition that is based on a load level and a degree of priority. Here, the management apparatus 30 includes a calculation unit 341, a load determining unit 343, a storage unit (management-side storage unit) 31, and a communication unit 33. The calculation unit 341 executes calculation of information processing that is based on information received from the control terminals 20a to 20c. The load determining unit 343 determines the load level corresponding to a load of the information processing by the calculation unit 341. The storage unit 31 stores a degree of priority that is based on a type of the equipment 10 and/or a type of information obtained from the equipment 10. The communication unit 33 transmits the degree of priority together with the load level to the control terminals 20a to 20c.

Accordingly, use of the management apparatus 30 according to this embodiment makes it possible to provide the equipment management system 1 (1X) capable of reducing the load on the control terminal 20.

8-18

A management apparatus 30 according to this embodiment controls, through a network, control terminals 20a to 20c that transmit information related to air conditioners 10a to 10i under a communication condition that is based on a load level and a degree of priority. Here, the management apparatus 30 includes a calculation unit 341, a load determining unit 343, a storage unit (management-side storage unit) 31, and a communication unit 33. The calculation unit 341 executes calculation of information processing that is based on information received from the control terminals 20a to 20c. The load determining unit 343 determines the load level corresponding to a load of the information processing by the calculation unit 341. The storage unit 31 stores a degree of priority that is based on a type of the equipment 10 and/or a type of information obtained from the equipment 10. The communication unit 33 transmits a communication condition determined on the basis of the load level and the degree of priority to the control terminals 20a to 20c.

Accordingly, use of the management apparatus 30 according to this embodiment makes it possible to provide the equipment management system 1 (1Z) capable of reducing the load on the control terminal 20.

8-19

The management apparatus 30 according to this embodiment is connected to monitoring terminals 40a to 40c through the network. The management apparatus 30 provides the monitoring terminals 40a to 40c with monitoring information available for display on the monitoring terminals 40a to 40c, on the basis of equipment information received from the control terminal 20. The management apparatus 30 limits a display item of the monitoring information in accordance with the degree of priority of the air conditioner 10 when the load level is determined.

Accordingly, in the management apparatus 30 according to this embodiment, the load on the calculation unit 341 can be reduced by limiting the display item of the monitoring information in accordance with the load level.

8-20

A control terminal 20 according to this embodiment is connected through a network to a management apparatus 30 that determines a load level corresponding to a load of information processing that is based on received information and transmits the load level. The control terminal 20 includes a processing unit (determining unit and communication condition changing unit) 23. The processing unit 23 determines a degree of priority that is based on a type of air conditioners 10a to 10i and/or a type of information obtained from the air conditioners. The processing unit 23 changes, in accordance with the load level and the degree of priority, a communication condition of equipment information to be transmitted.

Accordingly, use of the control terminal 20 according to this embodiment makes it possible to provide the equipment management system 1 (1Y) capable of reducing the load on the management apparatus 30.

8-21

In this embodiment, the control terminal 20 may control only one piece of equipment 10. Furthermore, the control terminal 20 may be incorporated into the piece of equipment 10. Thus, in the equipment management system 1, the management apparatus 30 may manage a plurality of pieces of equipment 10 each of which includes the control terminal incorporated therein.

SUPPLEMENTARY NOTE

The present disclosure is not limited to the above-described embodiment as is. The present disclosure can be embodied, in the stage of implementation, by modifying the elements without deviating from the gist thereof. In the present disclosure, a plurality of elements disclosed in the above-described embodiment may be appropriately combined to form various disclosures. For example, some of all the elements illustrated in the embodiment may be deleted. Furthermore, elements in different embodiments may be appropriately combined.

What is claimed is:

1. An equipment management system comprising:
   a control terminal configured to transmit equipment information related to equipment; and
   a management apparatus including a CPU and an interface, the management apparatus being configured to control the control terminal through a network,
   the CPU being configured to
     execute calculation of information processing that is based on information received from the control terminal,
     determine a load level corresponding to a load of the information processing by a calculation unit, and
     execute reduction control to reduce the load on the calculation unit in accordance with the load level,
   the interface being configured to transmit the load level to the control terminal, and
   the control terminal is further configured to change, in accordance with the load level, a communication condition of equipment information to be transmitted to the management apparatus.

2. The equipment management system according to claim 1, wherein
   the control terminal includes a memory that stores a degree of priority that is based on one or both of a type of the equipment and a type of information obtained from the equipment, and
   the control terminal is further configured to change the communication condition of the equipment information in accordance with the load level and the degree of priority.

3. The equipment management system according to claim 1, wherein
   the management apparatus further includes a memory that stores a degree of priority that is based on one or both of a type of the equipment and a type of information obtained from the equipment, the interface is further configured to transmit the degree of priority together with the load level to the control terminal, and the control terminal is further configured to change the communication condition in accordance with the load level and the degree of priority.

4. The equipment management system according to claim 2, wherein
the equipment is an air conditioner.

5. The equipment management system according to claim 4, wherein
the degree of priority of the air conditioner is determined from any one of or an arbitrary combination of
an installation status of the air conditioner,
a usage status of the air conditioner,
an attribute of the air conditioner, and
a purpose of monitoring the air conditioner.

6. The equipment management system according to claim 2, wherein
when the load level is determined, the interface transmits a reduction control notification to the control terminal, the reduction control notification indicating that the reduction control is to be executed.

7. The equipment management system according to claim 2, wherein
the CPU is further configured to suppress an information processing capability of the calculation of information processing along with notifying the control terminal of the load level.

8. The equipment management system according to claim 2, wherein
the CPU is further configured to set a threshold value corresponding to the load level.

9. The equipment management system according to claim 8, further comprising:
a monitoring terminal connected to the management apparatus through the network,
the threshold value being determined by the monitoring terminal.

10. The equipment management system according to claim 2, wherein
the CPU is further configured to detect the load based on any one of or an arbitrary combination of
memory usage amount,
CPU load, network load, and
an amount of access from an external system.

11. The equipment management system according to claim 2, further comprising:
a monitoring terminal connected to the management apparatus through the network,
the management apparatus being further configured to
provide the monitoring terminal with monitoring information available for display on the monitoring terminal, based on equipment information received from the control terminal, and
limit a display item of the monitoring information in accordance with the degree of priority of the equipment if the load level is determined.

12. The equipment management system according to claim 11, wherein
when the load level is determined, the interface transmits a reduction control notification to the monitoring terminal, the reduction control notification indicating that the reduction control is to be executed.

13. The equipment management system according to claim 12, wherein the CPU is further configured to execute the reduction control when receiving, from the monitoring terminal, an approval notification indicating approval of execution of the reduction control in response to transmission of the reduction control notification.

14. The equipment management system according to claim 11, wherein
the CPU is further configured to limit an information processing capability of the calculation of information processing along with limiting the display item of the monitoring information.

15. The equipment management system according to claim 11, wherein
the interface is further configured to transmit a reduction control notification to the control terminal, along with limiting the display item of the monitoring information, the reduction control notification indicating that the reduction control is to be executed.

16. The equipment management system according to claim 11, wherein
the CPU is further configured to limit a request from the monitoring terminal to the equipment along with limiting the display item of the monitoring information.

17. A management apparatus that controls, through a network, a control terminal that transmits information related to an air conditioner under a communication condition that is based on a load level and a degree of priority, the management apparatus comprising:
a CPU configured to
execute calculation of information processing that is based on information received from the control terminal, and
determine the load level corresponding to a load of the information processing by a calculation unit;
a memory that stores a degree of priority that is based on one or both of a type of an equipment and a type of information obtained from the equipment; and
an interface configured to transmit the degree of priority together with the load level to the control terminal.

18. A management apparatus that controls, through a network, a control terminal that transmits information related to an air conditioner under a communication condition that is based on a load level and a degree of priority, the management apparatus comprising:
a CPU configured to
execute calculation of information processing that is based on information received from the control terminal, and
determine the load level corresponding to a load of the information processing by a calculation unit;
a memory that stores a degree of priority that is based on one or both of a type of an equipment and a type of information obtained from the equipment; and
an interface configured to transmit a communication condition to the control terminal, the communication condition being determined based on the load level and the degree of priority.

19. The management apparatus according to claim 18, wherein the management apparatus
is connected to a monitoring terminal through the network,
provides the monitoring terminal with monitoring information available to display on the monitoring terminal, based on equipment information received from the control terminal, and limits a display item of the monitoring information in accordance with the degree of priority of the equipment when the load level is determined.

20. A control terminal connected through a network to a management apparatus that determines a load level corresponding to a load of information processing that is based on received information and transmits the load level, the control terminal being configured to:
   determine a degree of priority that is based on one or both of a type of an air conditioner and a type of information obtained from the air conditioner; and
   change, in accordance with the load level and the degree of priority, a communication condition of equipment information to be transmitted, the communication condition being changed to any one of
      maintaining a normal communication condition that permits communication,
      stopping part of the communication condition that partially stops communication, and
      stopping communication condition that stops communication,
   the type of air conditioner including one or more of
      the type of air conditioner classified according to the horsepower,
      the type of air conditioner classified according to the manufacture date, and
      the type of air conditioner classified according to the installation site, and
   the type of information obtained from the air conditioner including one or more of
      information classified according to whether a user is a president, a director, or an ordinary employee,
      information classified according to whether or not a person exists in the room,
      information classified according to an abnormal state, a normal state, or a stop state,
      information classified according to a state outside a comfortable area or a state inside the comfortable area,
      information classified according to whether a utilization time is during work hours, during overtime hours, or during night,
      information classified according to whether an information provider is a building manager or a tenant user, and
      information classified according to a specific purpose.

* * * * *